US011611421B2

(12) United States Patent
Li et al.

(10) Patent No.: US 11,611,421 B2
(45) Date of Patent: Mar. 21, 2023

(54) TECHNIQUES FOR IN-BAND REPEATER CONTROL

(71) Applicant: QUALCOMM Incorporated, San Diego, CA (US)

(72) Inventors: Junyi Li, Chester, NJ (US); Ashwin Sampath, Skillman, NJ (US); Navid Abedini, Somerset, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 207 days.

(21) Appl. No.: 16/947,472

(22) Filed: Aug. 3, 2020

(65) Prior Publication Data
US 2021/0044412 A1 Feb. 11, 2021

Related U.S. Application Data

(60) Provisional application No. 62/882,959, filed on Aug. 5, 2019.

(51) Int. Cl.
*H04L 5/00* (2006.01)
*H04B 7/0456* (2017.01)
*H04B 7/06* (2006.01)
*H04W 72/04* (2009.01)
*H04W 76/11* (2018.01)
*H04W 76/27* (2018.01)
*H04W 80/02* (2009.01)
*H04W 72/0446* (2023.01)
*H04W 92/04* (2009.01)

(52) U.S. Cl.
CPC ......... *H04L 5/0092* (2013.01); *H04B 7/0456* (2013.01); *H04B 7/0617* (2013.01); *H04W 72/0446* (2013.01); *H04W 76/11* (2018.02); *H04W 76/27* (2018.02); *H04W 80/02* (2013.01); *H04W 92/045* (2013.01)

(58) Field of Classification Search
CPC ... H04L 5/0092; H04B 7/0456; H04B 7/0617; H04W 72/0446; H04W 76/11; H04W 76/27; H04W 80/02
USPC ........................................................ 370/329
See application file for complete search history.

(56) References Cited

U.S. PATENT DOCUMENTS

| 2008/0311848 A1 | 12/2008 | Proctor, Jr. et al. | |
| 2011/0222428 A1 | 9/2011 | Charbit et al. | |
| 2013/0279346 A1* | 10/2013 | Zhang | H04B 17/40 370/246 |

(Continued)

FOREIGN PATENT DOCUMENTS

| WO | 2019122285 A1 | 6/2019 | |
| WO | WO-2019122285 A1 * | 6/2019 | ......... H04L 41/0816 |

OTHER PUBLICATIONS

R1-1814127 (Year: 2018).*

(Continued)

*Primary Examiner* — Intekhaab A Siddiquee
(74) *Attorney, Agent, or Firm* — Harrity & Harrity, LLP

(57) ABSTRACT

Various aspects of the present disclosure generally relate to wireless communication. In some aspects, a repeater may receive, in a bandwidth part that carries a control interface of the repeater, an indication of a repeater configuration for the repeater. The repeater may communicate, based at least in part on the repeater configuration, with at least one of a base station or a user equipment. Numerous other aspects are provided.

53 Claims, 16 Drawing Sheets

(56) References Cited

U.S. PATENT DOCUMENTS

2019/0089502 A1* 3/2019 Yi .................. H04W 72/0453
2020/0403689 A1* 12/2020 Rofougaran ........ H04W 52/245
2021/0328707 A1* 10/2021 Zhang .................. H04L 5/0053

OTHER PUBLICATIONS

International Search Report and Written Opinion—PCT/US2020/070362—ISA/EPO—datd Oct. 27, 2020.
LG Electronics: "Discussions on Access and Backhaul Link Multiplexing and Timing", 3GPP Draft; 3GPP TSG RAN WG1 Meeting #95, R1-1812566, 3rd Generation Partnership Project (3GPP), Mobile Competence Centre; 650, Route Des Lucioles; F-06921 Sophia-Antipolis Cedex; France, vol. RAN WG1, No. Spokane, US; Nov. 12-Nov. 16, 2018, Nov. 4, 2018 (Nov. 4, 2018), XP051478796, pp. 1-5.

* cited by examiner

TECHNIQUES FOR IN-BAND REPEATER CONTROL

CROSS-REFERENCE TO RELATED APPLICATION

This application claims priority to U.S. Provisional Patent Application No. 62/882,959, filed on Aug. 5, 2019, entitled "TECHNIQUES FOR IN-BAND REPEATER CONTROL," which is hereby expressly incorporated by reference herein.

FIELD OF THE DISCLOSURE

Aspects of the present disclosure generally relate to wireless communication and to techniques for in-band repeater control.

DESCRIPTION OF RELATED ART

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method of wireless communication includes receiving, in a bandwidth part (BWP) that carries a control interface of the repeater, an indication of a repeater configuration for the repeater; and communicating, based at least in part on the repeater configuration, with at least one of a base station (BS) or a user equipment (UE).

In some aspects, a repeater for wireless communication includes memory and one or more processors operatively coupled to the memory. The memory and the one or more processors are configured to receive, in a BWP that carries a control interface of the repeater, an indication of a repeater configuration for the repeater; and communicate, based at least in part on the repeater configuration, with at least one of a BS or a UE.

In some aspects, a non-transitory computer-readable medium stores one or more instructions for wireless communication. The one or more instructions, when executed by one or more processors of a repeater, cause the one or more processors to receive, in a BWP that carries a control interface of the repeater, an indication of a repeater configuration for the repeater; and communicate, based at least in part on the repeater configuration, with at least one of a BS or a UE.

In some aspects, an apparatus for wireless communication includes means for receiving, in a BWP that carries a control interface of the apparatus, an indication of a repeater configuration for the apparatus; and means for communicating, based at least in part on the repeater configuration, with at least one of a BS or a UE.

Aspects generally include a method, apparatus, system, computer program product, non-transitory computer-readable medium, user equipment, base station, wireless communication device, and/or processing system as substantially described herein with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

Figure 1:
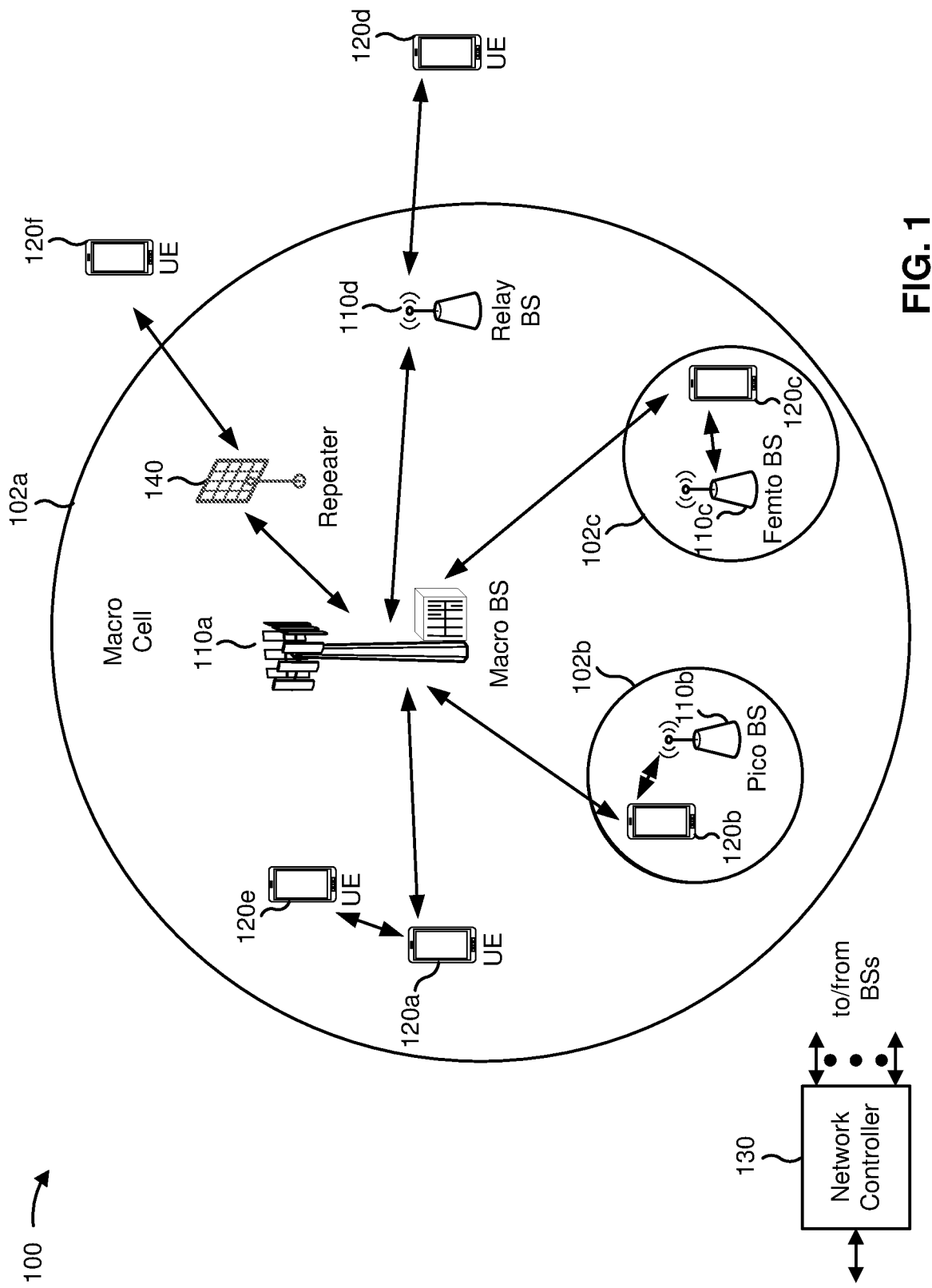
FIG. 1 is a block diagram conceptually illustrating an example of a wireless communication network, in accordance with various aspects of the present disclosure.

FIG. 1 is a diagram illustrating a wireless network 100 in which aspects of the present disclosure may be practiced. The wireless network 100 may be an LTE network or some other wireless network, such as a 5G or NR network. The wireless network 100 may include a number of BSs 110 (shown as BS 110a, BS 110b, BS 110c, and BS 110d) and other network entities. A BS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 watts)

whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular radio access technology (RAT) and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

In some aspects, a repeater 140 may receive a radio frequency (RF) analog signal (e.g., an analog millimeter wave signal) from a base station 110, may amplify the RF analog signal, and may transmit the amplified RF signal to one or more UEs 120 (e.g., shown as UE 120f). In some aspects, the repeater 140 may be an analog millimeter wave (mmW) repeater, sometimes also referred to as a layer 1 mmW repeater. Additionally, or alternatively, the repeater 140 may be a wireless transmit receive point (TRP) acting as a distributed unit (e.g., of a 5G access node) that communicates wirelessly with a base station 110 acting as a central unit or an access node controller (e.g., of the 5G access node). The repeater 140 may receive, amplify, and transmit an RF analog signal without performing analog-to-digital conversion of the RF analog signal and/or without performing any digital signal processing on the RF analog signal. In this way, latency may be reduced and a cost to produce the repeater 140 may be reduced. Additional details regarding repeater 140 are provided elsewhere herein.

As indicated above, FIG. 1 is provided as an example. Other examples may differ from what is described with regard to FIG. 1.

Figure 2:
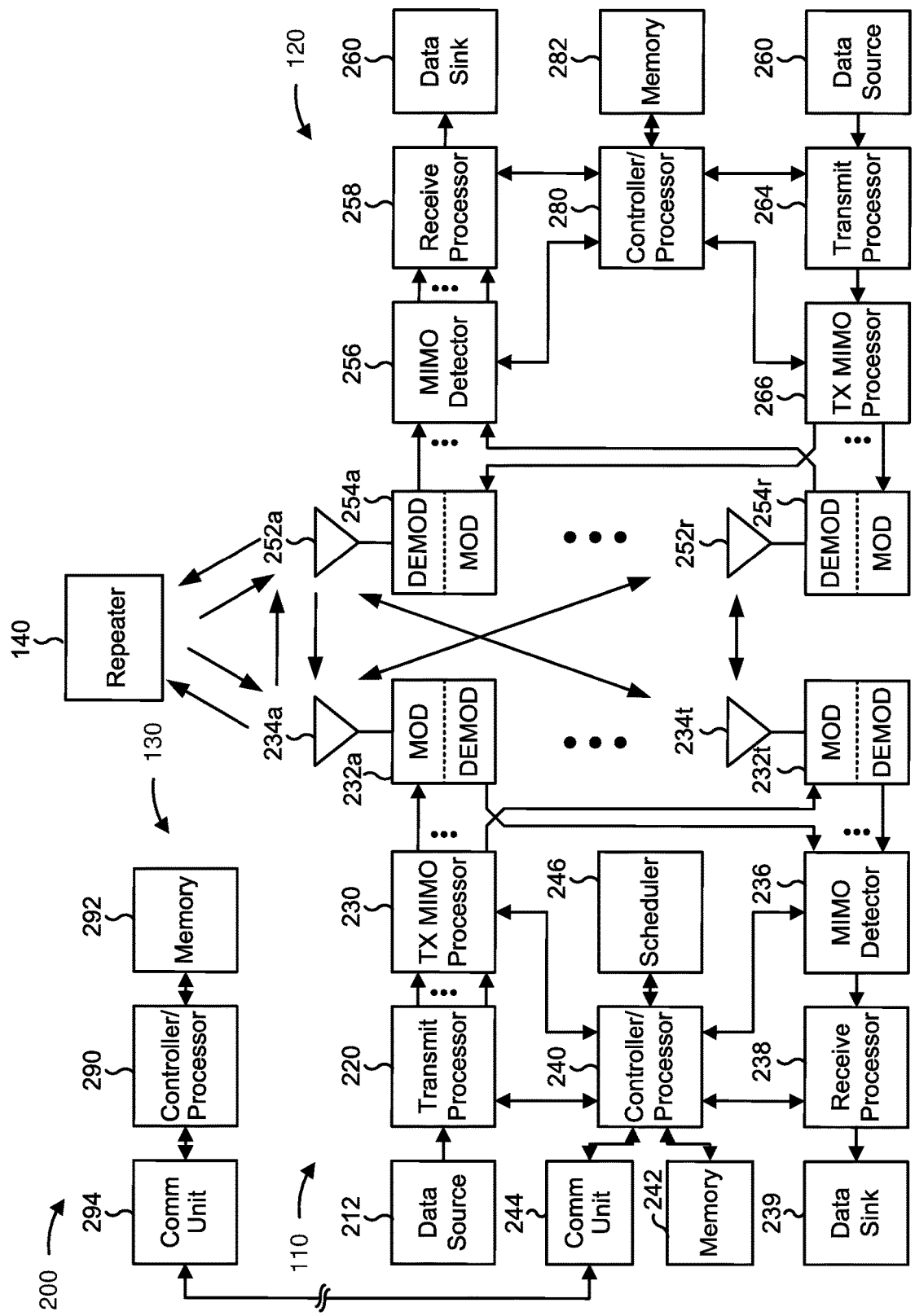
FIG. 2 is a block diagram conceptually illustrating an example of a base station in communication with a UE in a wireless communication network, in accordance with various aspects of the present disclosure.

FIG. 2 shows a block diagram of a design 200 of base station 110 and UE 120, which may be one of the base stations and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively to UE 120, repeater 140, and/or the like. According to various aspects described in more detail below, the synchronization signals can be generated with location encoding to convey additional information.

At UE 120, antennas 252a through 252r may receive the downlink signals from base station 110, repeater 140, and/or other wireless communication devices and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110 and/or to repeater 140. At base station 110, the uplink signals from UE 120, the repeater 140, and/or other wireless communication devices may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to a controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, and/or any other component(s) of FIG. 2 may perform one or more techniques associated with in-band repeater control, as described in more detail elsewhere herein. For example, controller/processor 240 of base station 110, controller/processor 280 of UE 120, and/or any other component(s) of FIG. 2 may perform or direct operations of, for example, process 700 of FIG. 7 and/or other processes as described herein. Memories 242 and 282 may store data and program codes for base station 110 and UE 120, respectively. In some aspects, memory 242 and/or memory 282 may comprise a non-transitory computer-readable medium storing one or more instructions for wireless communication. For example, the one or more instructions, when executed by one or more processors of the base station 110 and/or the UE 120, may perform or direct operations of, for example, process 700 of FIG. 7 and/or other processes as described herein. A scheduler 246 may schedule UEs for data transmission on the downlink and/or uplink.

In some aspects, UE 120 may include means for transmitting uplink communications to a BS 110 via a repeater 140, means for receiving downlink communications from the BS 110 via the repeater 140, and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like.

In some aspects, base station 110 may include means for configuring one or more repeater configurations for a repeater 140, means for transmitting an indication of the one or more repeater configurations to the repeater 140 in a bandwidth part (BWP) that carries a control interface of the repeater 140, means for transmitting downlink communications to a UE 120 via the repeater 140, means for receiving one or more uplink communications from the UE 120 via the repeater 140, and/or the like. In some aspects, such means may include one or more components of base station 110 described in connection with FIG. 2, such as antenna 234, DEMOD 232, MIMO detector 236, receive processor 238, controller/processor 240, transmit processor 220, TX MIMO processor 230, MOD 232, antenna 234, and/or the like.

As indicated above, FIG. 2 is provided as an example. Other examples may differ from what is described with regard to FIG. 2.

Figure 3:
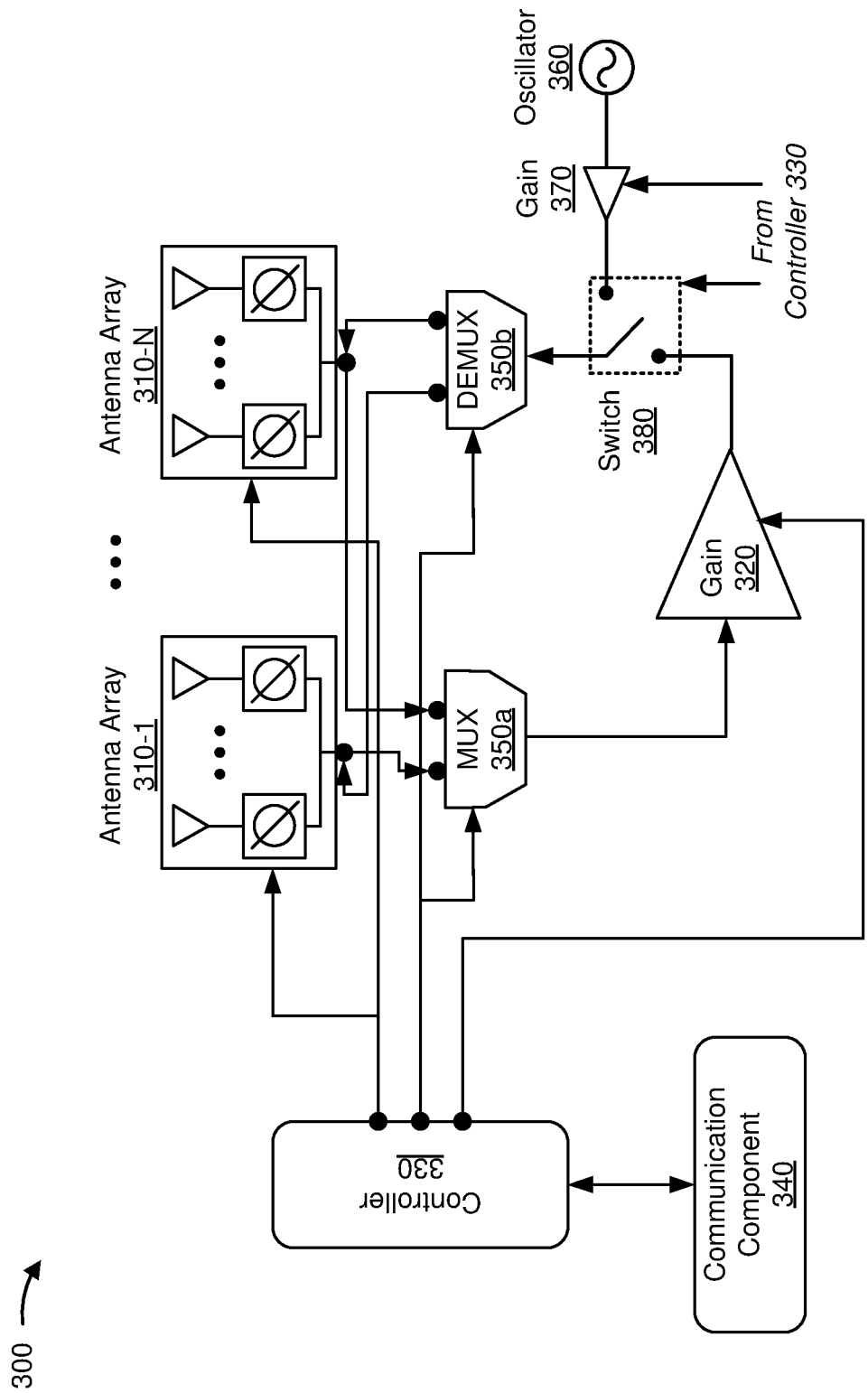
FIG. 3 is a diagram illustrating an example repeater, in accordance with various aspects of the present disclosure.

FIG. 3 is a diagram illustrating an example of a repeater 300, in accordance with various aspects of the present disclosure. In some aspects, repeater 300 may correspond to repeater 140 shown in FIG. 1. In some aspects, repeater 300 may be a millimeter wave repeater that communicates via millimeter wave transmissions (e.g., as opposed to sub-6 GHz transmissions).

As shown in FIG. 3, repeater 300 may include one or more antenna arrays (or antennas, antenna panels, and/or the like) 310-1 through 310-N (N>1), a gain component 320, a controller 330, a communication component 340, and a multiplexer (MUX) 350a and/or demultiplexer (DEMUX) 350b (collectively referred to as a MUX/DEMUX 350.

An antenna array 310 may include multiple antenna elements capable of being configured for beamforming. For example, an antenna array 310 may be referred to as a phased array because phase values and/or phase offsets of the antenna elements may be configured to form a beam, with different phase values and/or phase offsets being used for different beams (e.g., in different directions). In some aspects, an antenna array 310 may be a fixed receive (Rx) antenna array capable of only receiving communications while not transmitting communications. In some aspects, an antenna array 310 may be a fixed transmit (Tx) antenna array capable of only transmitting communications while not receiving communications. In some aspects, an antenna array 310 may be configured to act as an Rx antenna array or a Tx antenna array (e.g., via a Tx/Rx switch, a MUX/DEMUX, and/or the like). An antenna array 310 may be capable of communicating using millimeter waves and/or other types of RF analog signals.

Gain component 320 includes one or more components capable of amplifying an input signal and outputting an amplified signal. For example, gain component 320 may include a power amplifier, a variable gain component, and/or the like. In some aspects, gain component 320 may have variable gain control. Gain component 320 may connect to an Rx antenna array (e.g., a first antenna array 310-1) and a Tx antenna array (e.g., a second antenna array 310-2) such that an RF analog signal, received via the Rx antenna array, can be amplified by gain component 320 and output to the Tx antenna array for transmission. In some aspects, the level of amplification of gain component 320 may be controlled by the controller 330.

Controller 330 includes one or more components capable of controlling one or more other components of repeater 300. For example, controller 330 may include a controller, a microcontroller, a processor, and/or the like. In some aspects, controller 330 may control gain component 320 by controlling a level of amplification or gain applied by gain component 320 to an input signal. Additionally, or alternatively, controller 330 may control an antenna array 310 by controlling a beamforming configuration for the antenna array 310 (e.g., one or more phase values for the antenna array 310, one or more phase offsets for the antenna array 310, one or more power parameters for the antenna array 310, one or more beamforming parameters for the antenna array 310, a Tx beamforming configuration, an Rx beamforming configuration, and/or the like), by controlling whether the antenna array 310 acts as an Rx antenna array or a Tx antenna array (e.g., by configuring interaction and/or connections between the antenna array 310 and a MUX/DEMUX 350), and/or the like. Additionally, or alternatively, controller 330 may power on or power off one or more components of repeater 300 (e.g., when a BS 110 does not need to use the repeater to serve UEs 120). In some aspects, controller 330 may control a timing of one or more of the above configurations.

Additionally, or alternatively, controller 330 may control a position of a switch 380, included in repeater 300, in order to cause an oscillator 360, included in repeater 300, to be connected to one or more antennas 310 (e.g., via another gain component 370 included in repeater 300) in association with transmitting an RF analog signal. In some aspects, controller 330 may control gain component 370 by controlling a level of amplification or gain applied by gain component 370 to a signal provided by oscillator 360.

Communication component 340 may include a component capable of wirelessly communicating with a BS 110 via a control interface. In some aspects, communication component 340 may communicate with the BS 110 using one or more in-band radio frequencies (e.g., radio frequencies that are included within an operating frequency bandwidth of antenna arrays 310-1 through 310-N). In this case, the BS 110 may configure a BWP within the operating frequency bandwidth of antenna arrays 310-1 through 310-N (e.g., an in-band BWP) such that the BWP carries the control interface associated with repeater 300. In some aspects, an antenna array 310 may be used to wirelessly forward (e.g., transmit and/or receive) RF analog signals between repeater 300 and the BS 110, between repeater 300 and one or more UEs 120, and/or the like, and communication component 340 may be used to transfer control information between repeater 300 and the BS 110.

In some aspects, communication component 340 may include one or more components for digital signal processing (e.g., digital signal processor, a baseband processor, a digital-to-analog converter (DAC), an analog-to-digital converter (ADC), and/or the like). In this way, communication component 340 may demodulate, decode, and/or perform other types of processing on the control information received from a BS 110.

MUX/DEMUX 350 may be used to multiplex and/or demultiplex communications received from and/or transmitted to an antenna array 310. For example, MUX/DEMUX 350 may be used to switch an Rx antenna array to a Tx antenna array.

Oscillator 360 may be used to generate an RF analog signal for transmission by repeater 300 via an antenna array 310. Gain component 370 includes one or more components capable of amplifying an input signal and outputting an amplified signal (e.g., an amplified RF analog signal). For example, gain component 370 may include a power amplifier, a variable gain component, and/or the like. In some aspects, gain component 370 may have variable gain control. The gain component 370 may connect to oscillator 360 and a Tx antenna array (e.g., an antenna array 310) such that an RF analog signal, provided by oscillator 360, can be amplified by gain component 370 and output to the Tx antenna array for transmission. In some aspects, the level of amplification of gain component 370 may be controlled by controller 330.

Switch 380 includes one or more components capable of enabling repeater 300 to operate either to relay a signal received via an Rx antenna array (e.g., an antenna array 310) or to transmit an RF analog signal generated by repeater 300 (e.g., an RF analog signal generated by oscillator 360 and amplified by gain component 370). In some aspects, the position of switch 380 may be controlled by the controller 330.

In some aspects, one or more antenna arrays 310, gain component 320, controller 330, communication component 340, MUX/DEMUX 350, oscillator 360, gain component 370, switch 380, and/or the like may perform one or more techniques associated with in-band configuration of a repeater, as described in more detail elsewhere herein. For example, one or more components of repeater 300 may perform or direct operations of, for example, process 700 of FIG. 7 and/or other processes as described herein.

In some aspects, repeater 300 may include means for receiving, in a BWP that carries a control interface of a repeater, an indication of a repeater configuration for the repeater, means for communicating, based at least in part on the repeater configuration, with at least one of a BS or a UE, and/or the like. In some aspects, such means may include one or more components of repeater 300 described in connection with FIG. 3, such as antenna array 310, gain component 320, controller 330, communication component 340, MUX/DEMUX 350, oscillator 360, gain component 370, and/or switch 380.

As indicated above, FIG. 3 is provided as an example. Other examples may differ from what is described with regard to FIG. 3. For example, repeater 300 may include additional components, fewer components, different components, or differently arranged components than those shown in FIG. 3. Furthermore, two or more components shown in FIG. 3 may be implemented within a single component, or a single component shown in FIG. 3 may be implemented as multiple components. Additionally, or alternatively, a set of components (e.g., one or more components) of repeater 300 may perform one or more functions described as being performed by another set of components of repeater 300.

Figure 4:
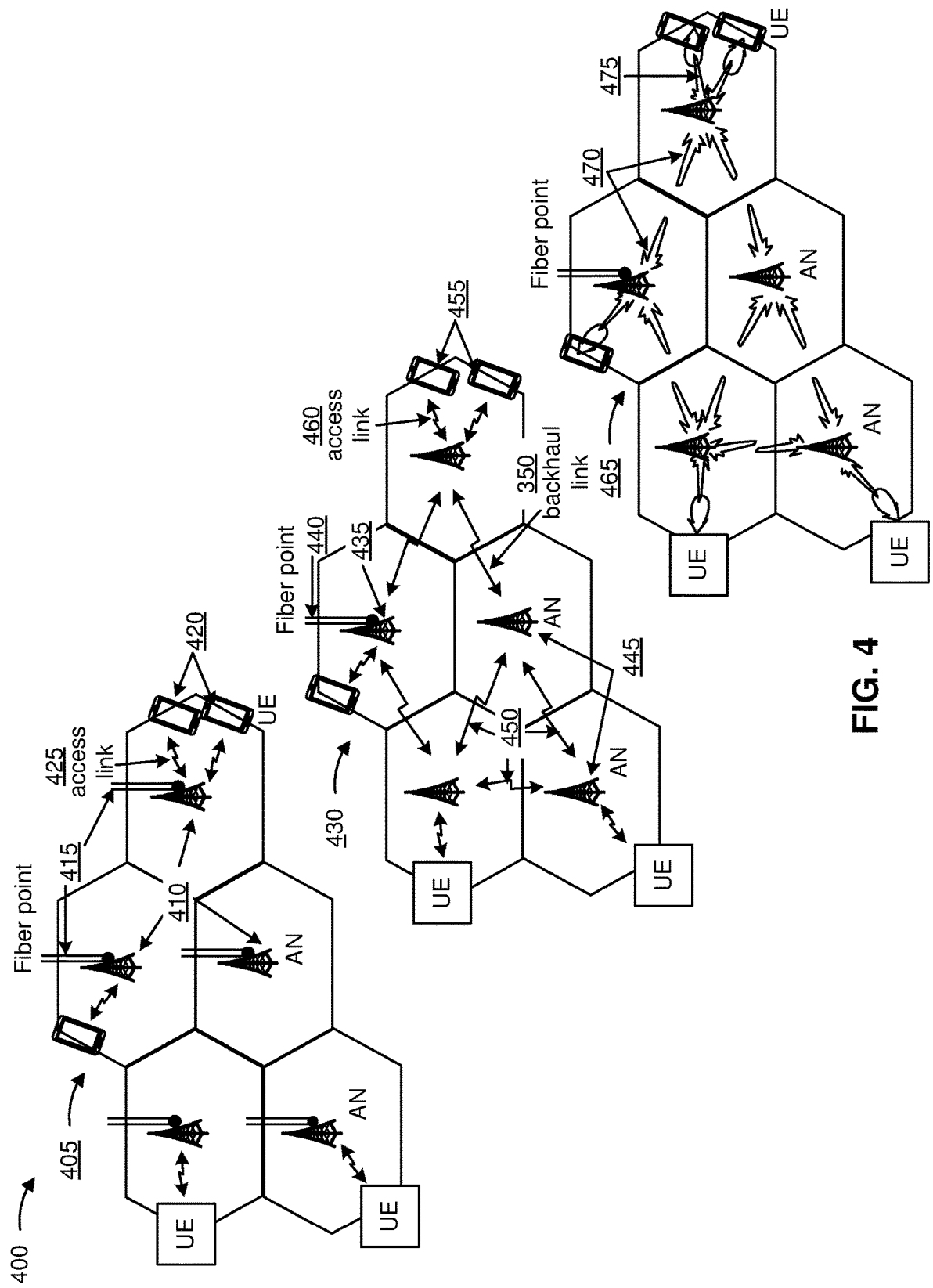
FIG. 4 is a diagram illustrating examples of radio access networks, in accordance with various aspects of the present disclosure.

FIG. 4 is a diagram illustrating examples 400 of radio access networks, in accordance with various aspects of the disclosure.

As shown by reference number 405, a traditional (e.g., 3G, 4G, LTE, and/or the like) radio access network may include multiple BSs 410 (e.g., access nodes (AN)), where each BS 410 communicates with a core network via a wired backhaul link 415, such as a fiber connection. A BS 410 may communicate with a UE 420 via an access link 425, which may be a wireless link. In some aspects, a BS 410 shown in FIG. 4 may correspond to a BS 110 shown in FIG. 1. Similarly, a UE 420 shown in FIG. 4 may correspond to a UE 120 shown in FIG. 1.

As shown by reference number 430, a radio access network may include a wireless backhaul network, sometimes referred to as an integrated access and backhaul (IAB) network. In an IAB network, at least one BS is an anchor BS 435 that communicates with a core network via a wired backhaul link 440, such as a fiber connection. An anchor BS 435 may also be referred to as an IAB donor (or IAB-donor). The IAB network may include one or more non-anchor BSs 445, sometimes referred to as relay BSs or IAB nodes (or IAB-nodes). The non-anchor BS 445 may communicate directly with or indirectly with (e.g., via one or more other non-anchor BSs 445) the anchor BS 435 via one or more backhaul links 450 to form a backhaul path to the core network for carrying backhaul traffic. Backhaul link 450 may be a wireless link. Anchor BS(s) 435 and/or non-anchor BS(s) 445 may communicate with one or more UEs 455 via access links 460, which may be wireless links for carrying access traffic. In some aspects, an anchor BS 435 and/or a non-anchor BS 445 shown in FIG. 4 may correspond to a BS 110 shown in FIG. 1. Similarly, a UE 455 shown in FIG. 4 may correspond to a UE 120 shown in FIG. 1.

As shown by reference number 465, in some aspects, a radio access network that includes an IAB network may utilize millimeter wave technology and/or directional communications (e.g., beamforming, precoding, and/or the like) for communications between BSs and/or UEs (e.g., between two BSs, between two UEs, and/or between a BS and a UE). For example, wireless backhaul links 470 between BSs may use millimeter waves to carry information and/or may be directed toward a target BS using beamforming, precoding, and/or the like. Similarly, the wireless access links 475 between a UE and a BS may use millimeter waves and/or may be directed toward a target wireless node (e.g., a UE and/or a BS). In this way, inter-link interference may be reduced.

In some aspects, an IAB network may support a multi-hop network and/or a multi-hop wireless backhaul. Additionally, or alternatively, each node of an IAB network may use the same radio access technology (e.g., 5G/NR). Additionally, or alternatively, nodes of an IAB network may share resources for access links and backhaul links, such as time resources, frequency resources, spatial resources, and/or the like. Furthermore, various architectures of IAB nodes and/or IAB donors may be supported. In some aspects, an IAB donor may include a central unit (CU) that configures IAB nodes that access a core network via the IAB donor, and may include a distributed unit (DU) that schedules and communicates with child nodes of the IAB donor. An IAB node may include a mobile terminal (MT) that is scheduled by and communicates with a DU of a parent node, and may include a DU that schedules and communicates with child nodes of the IAB donor. A DU of a node may perform functions described herein in connection with BS 110 for that node, and an MT of a node may perform functions described herein in connection with UE 120 for that node.

In some aspects, propagation distances in an IAB network or another type of wireless communication network can be improved by using a repeater 140. For example, a repeater 140 may forward signals between a UE and a BS, an IAB donor, or an IAB node. As another example, a repeater 140 ay forward signals between IAB donors, between an IAB donor and an IAB node, and/or the like. In some aspects, "backhaul link" may refer to a link between a BS and a repeater 140, and "access link" may refer to a link between a repeater 140 and a UE.

As indicated above, FIG. 4 is provided as an example. Other examples may differ from what is described with regard to FIG. 4.

Figure 5A:
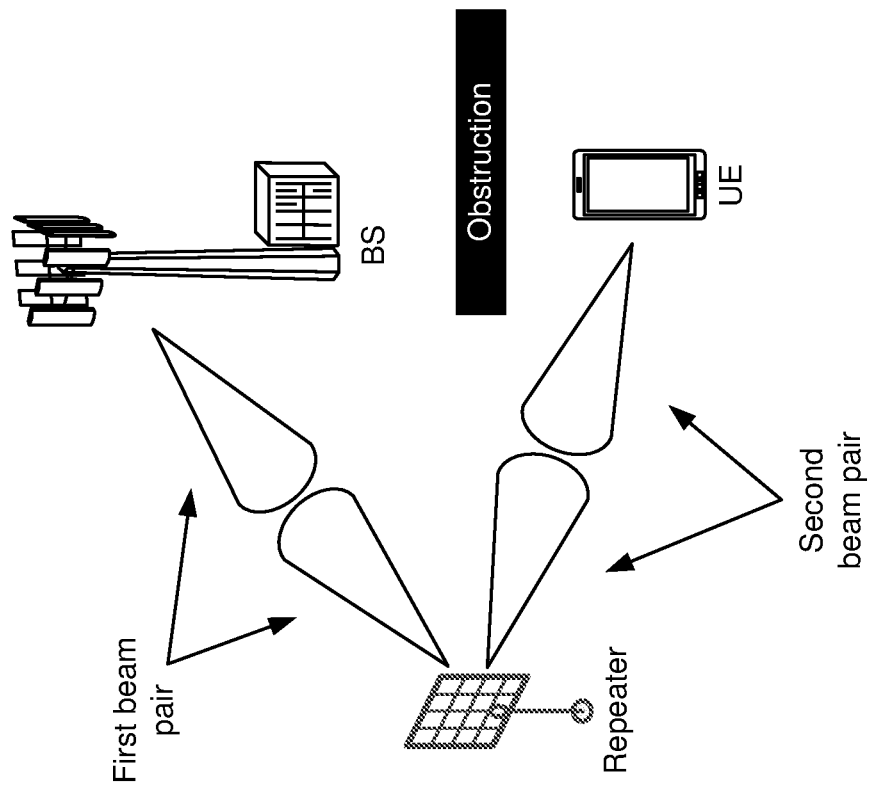
FIGS. 5A-5C are diagrams illustrating examples of communication using a repeater, in accordance with various aspects of the present disclosure.
Figure 5B:
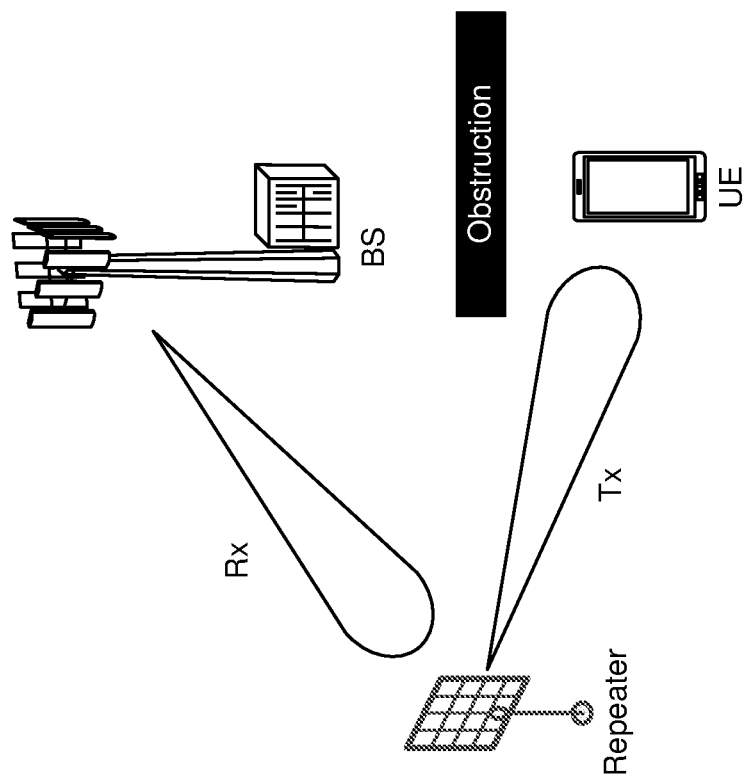
Figure 5C:
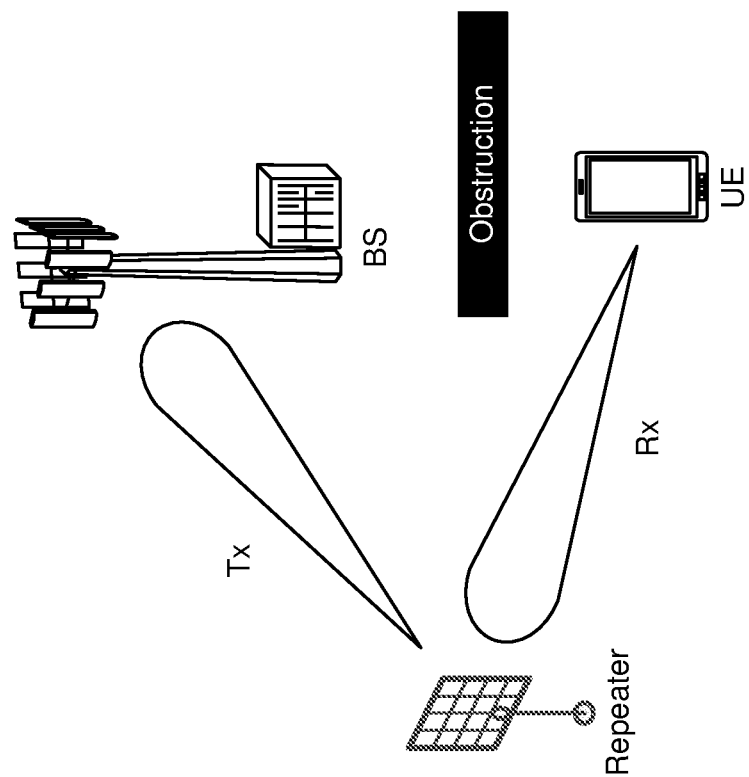

FIGS. 5A-5C are diagrams illustrating examples 500 of communication using a repeater, in accordance with various aspects of the present disclosure.

Because millimeter wave communications have a higher frequency and shorter wavelength than other types of radio waves used for communications (e.g., sub-6 GHz communications), millimeter wave communications may have shorter propagation distances and may be more easily blocked by obstructions than other types of radio waves. For example, a wireless communication that uses sub-6 GHz radio waves may be capable of penetrating a wall of a building or a structure to provide coverage to an area on an opposite side of the wall from a BS 110 that communicates using the sub-6 GHz radio waves. However, a millimeter wave may not be capable of penetrating the same wall (e.g., depending on a thickness of the wall, a material from which the wall is constructed, and/or the like). Some techniques and apparatuses described herein use a repeater 140 to increase the coverage area of a BS 110 (e.g., a BS 110 that communicates using millimeter wave communications and/or other types of communications), to extend coverage to UEs 120 without line of sight to the BS 110 (e.g., due to an obstruction), and/or the like.

For example, as illustrated in the example of FIG. 5A, an obstruction between a UE and a BS blocks or otherwise reduces the quality of a link between the BS and the UE. However, no obstructions or fewer obstructions exist between a repeater and the UE and, as a result, it is possible that communications between the repeater and the UE will have a higher quality than communications directly between the BS the UE.

As further shown in FIG. 5A, the repeater may perform directional communication by using beamforming to communicate with the BS via a first beam pair (e.g., a backhaul beam pair over a backhaul link) and to communicate with the UE via a second beam pair (e.g., an access beam pair over an access link). "Beam pair" may refer to a transmit (Tx) beam used by a first device for transmission and a receive (Rx) beam used by a second device for reception of information transmitted by the first device via the Tx beam.

As shown in FIG. 5B, the repeater may relay or forward downlink communications by transmitting RF analog signals received from the BS via an Rx beam of the first beam pair to the UE using a Tx beam of the second beam pair. In some aspects, the combination of the Rx beam of the first beam pair and the Tx beam of the second beam pair may be referred to as a downlink path.

As used herein, relaying or forwarding a received RF analog signal may refer to transmitting the received RF analog signal (e.g., after amplifying the received RF analog signal) without decoding the received RF analog signal and/or without modifying information carried in the received RF analog signal. Alternatively, relaying or forwarding a received RF analog signal may refer to transmitting the received RF analog signal after decoding the received signal and/or modifying information carried in the received RF analog signal. In some aspects, a received RF analog signal may be relayed or forwarded using a different time resource, a different frequency resource, and/or a different spatial resource (e.g., a different beam) to transmit the RF analog signal as compared to a time resource, a frequency resource, and/or a spatial resource in which the RF analog signal was received.

As shown in FIG. 5C, the repeater may relay or forward uplink communications by transmitting RF analog signals received from the UE via an Rx beam of the second beam pair to the BS using an Rx beam of the first beam pair. In some aspects, the combination of the Tx beam of the first beam pair and the Rx beam of the second beam pair may be referred to as an uplink path.

As indicated above, FIGS. 5A-5C are provided as examples. Other examples may differ from what is described with regard to FIGS. 5A-5C.

As indicated above, a repeater (e.g., a repeater 140, a repeater 300, and/or the like) may be capable of receiving and relaying or forwarding an RF analog signal from a BS (e.g., a BS 110) and a UE (e.g., UE 120). However, to reduce the cost and complexity of the repeater and/or to reduce the cost and complexity of deploying the repeater in a wireless network, the repeater may not be equipped and/or configured with hardware and/or software that would otherwise permit the repeater to track, monitor, and/or otherwise manage the access link and corresponding beam pair associated with a UE with which the repeater communicates. As a result, the repeater may generally not be capable of determining which beams to use for communication with the UE, may not be capable of determining when the repeater is to be active for forwarding communications between the BS and the UE, may not be capable of determining when the repeater may operate in an idle or low-power mode (e.g., by powering off particular components and/or interfaces of the repeater), and/or the like. This may cause reduced operating efficiency of the repeater. For example, the repeater may consume processing, memory, and/or power resources when the repeater should be in an idle or low-power mode, the repeater may operate using suboptimal beams for communicating with the BS and/or the UE, and/or the like.

Some aspects described herein provide techniques and apparatuses associated with in-band repeater control. In some aspects, a BS may configure a repeater configuration, based at least in part on which a repeater (e.g., a repeater 140, a repeater 300, and/or the like) may communicate with a BS and/or a UE by relaying or forwarding RF analog signals between the BS and the UE. The BS may transmit an indication of the repeater configuration to the repeater by in-band control signaling. For example, the BS may transmit the indication of the repeater configuration on a control interface associated with the repeater, and the control interface may be carried in a BWP that is included in an operating frequency bandwidth of the repeater.

The BWP includes a contiguous set of physical resource blocks of the operating frequency bandwidth that is active and used by the repeater to forward communications between other wireless communication devices (e.g., UEs, BSs, and/or the like). The control interface may be a communication interface between the UE and the BS that is configured to carry control signaling and/or control communications between the UE and the BS. The control interface is included in at least a portion of the contiguous set of physical resource blocks of the BWP. Accordingly, the indication of the repeater configuration is an in-band repeater configuration in that the indication of the repeater configuration is transmitted within the BWP (e.g., within the control interface). In this way, the indication of the repeater configuration may be transmitted to the repeater without the need for the repeater to activate and using additional frequency resources outside of the BWP, which reduces memory resource, processing resource consumption, power consumption, and/or radio resource consumption for the repeater.

Moreover, transmitting the repeater configuration to the repeater on the control interface in the BWP enables the BS to configure efficient operation of the repeater while permitting less complex repeaters to be deployed in a wireless network. For example, the BS may use the repeater configuration to indicate, to the repeater, one or more time durations during which the repeater may communicate with the BS and/or the UE, may indicate whether the repeater is to operate in an idle or low-power mode (e.g., by powering on or off particular components of the repeater), may indicate whether the repeater is to activate an uplink path and/or downlink path between the BS and the UE, may indicate one or more beamforming parameters, and/or other parameters. In this way, the repeater is enabled to receive the in-band communication from the BS, and is enabled to operate according parameters that are optimally selected for the repeater in the repeater configuration.

FIGS. 6A-6E are diagrams illustrating examples 600 of in-band repeater control, in accordance with various aspects of the present disclosure. As shown in FIGS. 6A-6E, examples 600 may include communication between a BS (e.g., BS 110), a UE (e.g., UE 120), and a repeater (e.g., repeater 140, repeater 300, and/or the like). In some aspects, the BS, the UE, and the repeater may be included in a wireless network (e.g., wireless network 100). In some aspects, the BS and/or the UE may perform one or more techniques described in connection with FIGS. 6A-6E using one or more components described above in connection with FIG. 2. In some aspects, the repeater may perform one or more techniques described in connection with FIGS. 6A-6E using one or more components described above in connection with FIG. 3.

Figure 6A:
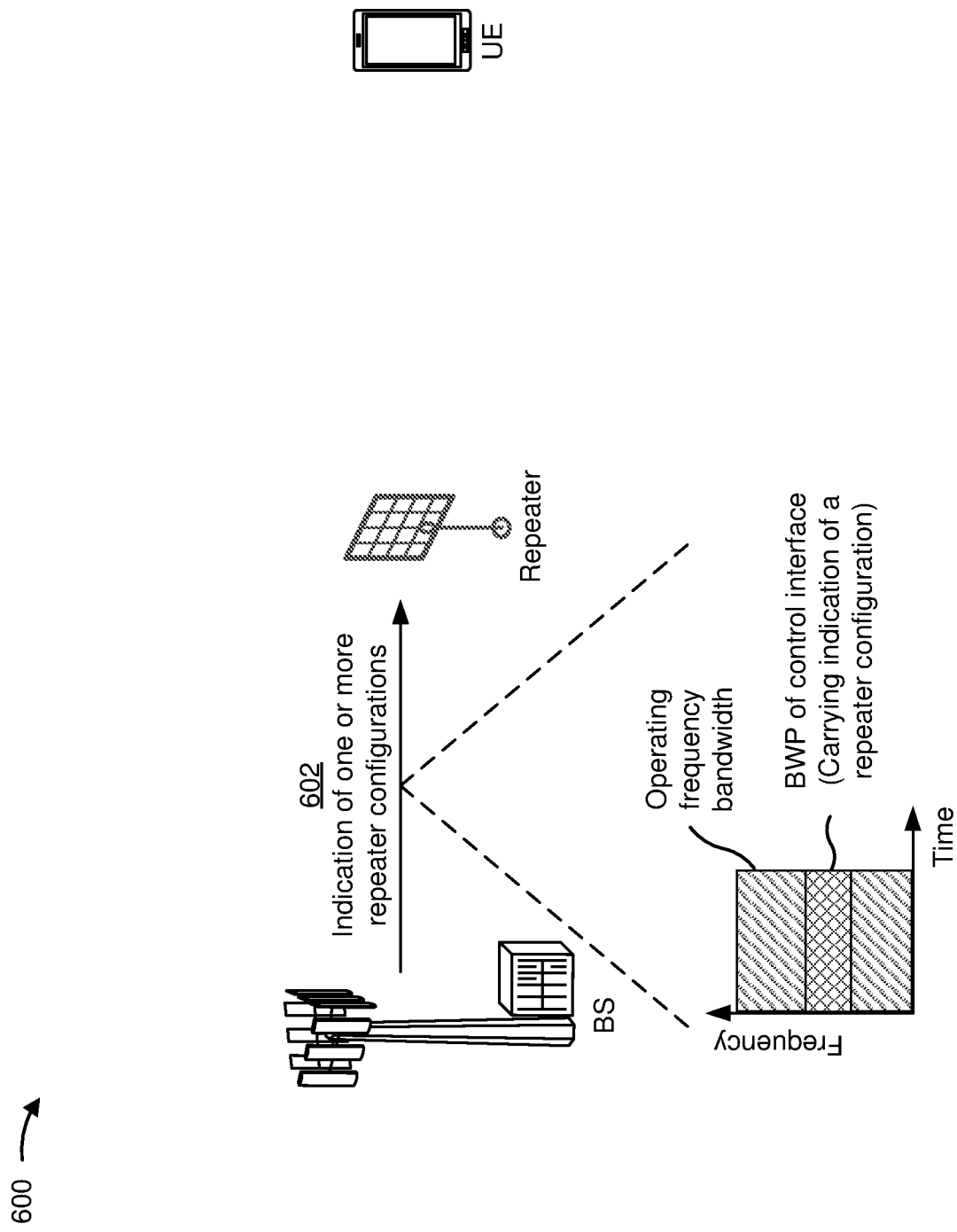
FIGS. 6A-6E are diagrams illustrating examples of in-band repeater control, in accordance with various aspects of the present disclosure.

As shown in FIG. 6A, and by reference number 602, to configure the repeater for communication with the BS and/or the UE, the BS may generate one or more repeater configurations and may transmit an indication of the one or more repeater configurations to the repeater. In some aspects, the BS may transmit and the repeater may receive an indication of the repeater configuration via a control interface associated with the repeater. Moreover, the BS may transmit the indication of the repeater configuration in an in-band BWP that carries the control interface. In other words, the BWP may be included within an operating frequency bandwidth of the repeater (e.g., a frequency bandwidth that the repeater uses to relay or forward RF analog signals between the BS and the UE).

The BWP includes a contiguous set of physical resource blocks of the operating frequency bandwidth that is active and used by the repeater to forward communications between other wireless communication devices (e.g., UEs, BSs, and/or the like). The control interface may be a communication interface between the UE and the BS that is configured to carry control signaling and/or control communications between the UE and the BS. The control interface is included in at least a portion of the contiguous set of physical resource blocks of the BWP. Accordingly, the indication of the repeater configuration is an in-band repeater configuration in that the indication of the repeater configuration is transmitted within the BWP (e.g., within the control interface). In this way, the indication of the repeater configuration may be transmitted to the repeater without activating and using additional frequency resources outside of the BWP.

In some aspects, the BS may direct the indication of the one or more repeater configurations to the repeater (e.g., as opposed to communications that are directed to the UE) by transmitting the indication of the one or more repeater configurations to the repeater based at least in part on an identifier associated with the repeater. For example, the BS may scramble a signaling communication carrying the indication of the one or more repeater configurations, based at least in part on a radio network temporary identifier (RNTI) associated with the repeater, which may be different from an RNTI or another identifier associated with the UE. In this case, the repeater may receive the indication of the one or more repeater configurations in the signaling communication and may descramble the signaling communication based at least in part on the RNTI associated with the repeater.

In some aspects, the BS may specify (e.g., in a signaling communication identifying the one or more repeater configurations, in another signaling communication, and/or the like) that the repeater is to provide acknowledgement (ACK) or negative acknowledgement (NACK) feedback for the signaling communication identifying the one or more repeater configurations. For example, the BS may specify that the repeater is to provide an ACK or a NACK. In this case, the repeater may transmit an ACK to the BS if the repeater successfully receives and decodes the signaling communication, and may transmit a NACK if the repeater cannot decode the signaling communication. As another example, the BS may specify that the repeater is to provide ACK-only feedback. In this case, the repeater may transmit an ACK to the BS if the repeater successfully receives and decodes the signaling communication, and provide no feedback to the BS if the repeater cannot decode the signaling communication. As another example, the BS may specify that the repeater is to provide NACK-only feedback. In this case, the repeater may transmit a NACK to the BS if the repeater cannot decode the signaling communication, and provide no feedback to the BS if the repeater successfully receives and decodes the signaling communication.

In some aspects, the BS may configure a repeater configuration to identify one or more time durations during which the repeater may communicate with the BS and/or the UE based at least in part on one or more configuration parameters identified in the repeater configuration. In some aspects, the BS may configure a plurality of candidate repeater configurations. Each of the candidate repeater configurations may include a combination of time durations and configuration parameters. In this case, each candidate configuration may be row or column indexed in a table, electronic database, electronic file, a specification, and/or another data structure. This permits the BS to transmit, to the repeater, a signaling communication that indexes into the plurality of candidate repeater configurations to identify the repeater configuration (e.g., by identifying a row index or column index associated with the repeater configuration).

A time duration may include one or more symbols, one or more slots, one or more subframes, one or more radio frames, and/or other time-domain units. In some aspects, a time duration may be indicated in a repeater configuration by a starting time of the time duration and/or an explicit indication of an ending time of the time duration (e.g., by a symbol number, slot number, frame number, and/or the like). In some aspects, a time duration may be indicated in a repeater configuration by a starting time and a timing offset relative to the starting time (e.g., number of symbols, slots, and/or other time-domain units relative to the starting time), which may implicitly indicate the ending time.

In some aspects, the starting time of a time duration may be explicitly indicated in a repeater configuration. For example, the repeater configuration may specify a symbol number, slot number, frame number, and/or the like at which the time duration is to commence. In some aspects, the starting time of a time duration may be implicitly indicated in the repeater configuration. For example, the repeater configuration may specify a timing offset (e.g., number of symbols, slots, and/or other time-domain units) relative to a time at which the signaling communication identifying the repeater configuration was transmitted by the BS or received by the repeater. In this case, the timing offset (and thus, the starting time) may be based at least in part on a capability associated with the repeater. For example, the repeater may transmit an indication to the BS of a capability parameter associated with the capability of the repeater to receive and process a repeater configuration. In this way, the BS may consider the hardware and/or software capability of the repeater when configuring time durations for a repeater configuration for the repeater.

In some aspects, the configuration parameters included in a repeater configuration may include various operating mode parameters, communication path parameters, beamforming parameters, measurement parameters, reference signal parameters, and/or other types of configuration parameters. In some aspects, a repeater configuration may include one or more of the configuration parameters described herein and/or other configuration parameters.

In some aspects, a repeater configuration may indicate that the repeater is to be powered on (e.g., that the repeater is to power on one or more components of the repeater, such as one or more antenna arrays 310, gain component 320, controller 330, communication component 340, MUX/DEMUX 350, oscillator 360, gain component 370, switch 380, and/or the like) and is to operate in an active mode during a time duration indicated in the repeater configuration. In some aspects, a repeater configuration may indicate that the repeater is to power off one or more components of the repeater (e.g., one or more antenna arrays 310, gain component 320, controller 330, communication component 340, MUX/DEMUX 350, oscillator 360, gain component 370, switch 380, and/or the like) such that the repeater operates in an idle, inactive, or low-power mode during a time duration indicated in the repeater configuration.

In some aspects, a repeater configuration may indicate that the repeater is to activate an uplink path between the BS and the UE during a time duration indicated in the repeater configuration and/or is to activate a downlink path between the BS and the UE during the time duration. In this case, the repeater may activate an Rx beam of a first beam pair associated with the BS and a Tx beam of second beam pair associated with the UE to activate the downlink path and/or may activate a Tx beam of a first beam pair associated with the BS and an Rx beam of second beam pair associated with the UE to activate the uplink path.

In some aspects, a repeater configuration may indicate a gain parameter that the repeater is to use for relaying or forwarding RF analog signals during a time duration indicated in the repeater configuration. In this case, a controller of the repeater (e.g., controller 330) may control a gain component (e.g., gain component 320, gain component 370, and/or the like) by controlling, based at least in part on the gain parameter, a level of amplification or gain that is applied by the gain component to an input signal when generating an output signal.

In some aspects, a repeater configuration may indicate one or more beamforming configurations, such as a transmit beamforming configuration and/or a receive beamforming configuration, that the repeater is to use during a time duration indicated in the repeater configuration. The transmit beamforming configuration may identify a codebook-based codeword index for the Tx beam associated with the BS and/or the Tx beam associated with the UE, one or more beamforming weights (e.g., phase shifting coefficients, amplitude coefficients, and/or the like) that are to be applied to the Tx beam associated with the BS and/or the Tx beam associated with the UE, adjustments to one or more beamforming weights of the Tx beam associated with the BS and/or the Tx beam associated with the UE (e.g., adjustments to phase shift and/or amplitude of the Tx beam associated with the BS and/or the Tx beam associated with the UE), and/or other beamforming parameters.

Similarly, the receive beamforming configuration may identify a codebook-based codeword index for the Rx beam associated with the BS and/or the Rx beam associated with the UE, one or more beamforming weights (e.g., phase shifting coefficients, amplitude coefficients, and/or the like) that are to be applied to the Rx beam associated with the BS and/or the Rx beam associated with the UE, adjustments to one or more beamforming weights of the Rx beam associated with the BS and/or the Rx beam associated with the UE (e.g., adjustments to phase shift and/or amplitude of the Rx beam associated with the BS and/or the Rx beam associated with the UE), and/or other beamforming parameters.

In some aspects, a repeater configuration may indicate that the repeater is to perform one or more measurements during a time duration indicated in the repeater configuration, and may indicate that the repeater is to report the measurement results to the BS during the time duration and/or is to store the measurement results and report the measurement results at another time. The one or more measurements may include one or more RSRP measurements, one or more RSSI measurements, one or more RSRQ measurements, one or more CQI measurements, and/or the like. The repeater configuration may indicate that the repeater is to perform the one or more measurements for one or more uplink communications received from the UE during the time duration and/or for one or more downlink communications received from the BS during the time duration.

In some aspects, a repeater configuration may indicate that the repeater is to transmit one or more reference signals to the BS and/or the UE during a time duration indicated in the repeater configuration. The one or more reference signals may include a channel state information reference signal (CSI-RS), a demodulation reference signal (DMRS), a sounding reference signal (SRS), and/or other types of reference signals.

Figure 6B:
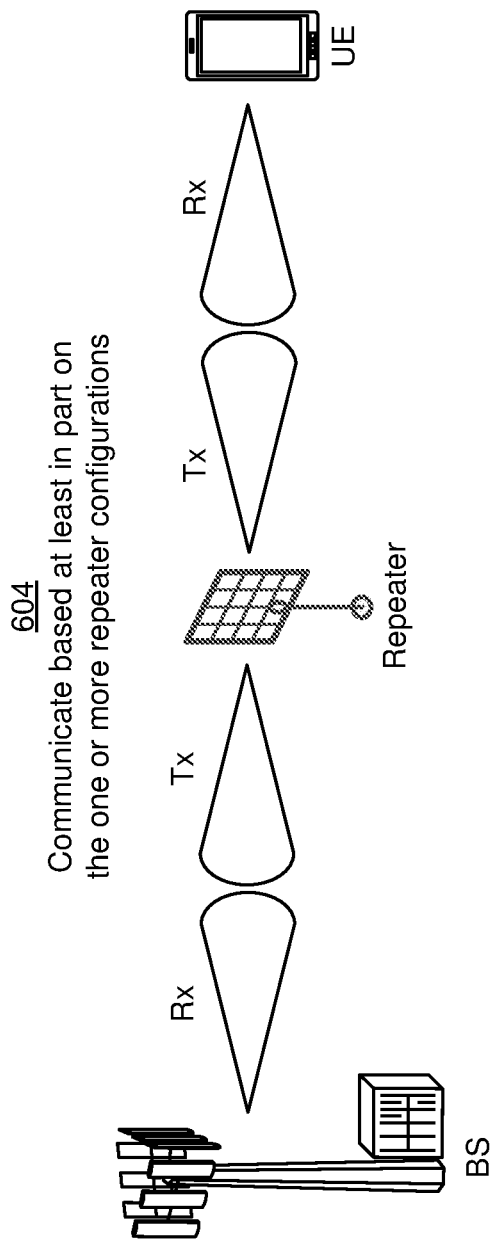

As shown in FIG. 6B, and by reference number 604, the repeater may communicate with the BS and/or the UE based at least in part on the one or more repeater configurations received from the BS. In some aspects, the repeater may communicate with the BS and/or the UE based at least in part on one or more configuration parameters, indicated in the one or more repeater configurations, during one or more time durations indicated in the one or more repeater configurations.

For example, the repeater may power on one or more components associated with the repeater and/or power off one or more components associated with the repeater during a time duration indicated in a repeater configuration based at least in part on an indication in the repeater configuration to power on the one or more components and/or power off the one or more components.

As another example, if a repeater configuration indicates that the repeater is to activate an uplink path between the BS and the UE and/or a downlink path between the BS and the UE during a time duration indicated by the repeater configuration, the repeater configuration may activate one or more Tx beams and/or Rx beams to activate the uplink path and/or the downlink path. In some aspects, the repeater may communicate with the BS and/or the UE via the uplink path by receiving, on an Rx beam, an RF analog signal carrying an uplink communication from the UE and relaying or forwarding the RF analog signal to the BS on a Tx beam. In some aspects, the repeater may communicate with the BS and/or the UE on the downlink path by receiving, on an Rx beam, an RF analog signal carrying a downlink communication from the BS and relaying or forwarding the RF analog signal to the UE on a Tx beam.

As another example, if a repeater configuration includes a receive beamforming configuration, the repeater may configure one or more Rx beams based at least in part on the one or more configuration parameters identified in the receive beamforming configuration and receive one or more communications (e.g., uplink communications and/or downlink communications) via the configured one or more Rx beams. As another example, if a repeater configuration includes a transmit beamforming configuration, the repeater may configure one or more Tx beams based at least in part on the one or more configuration parameters identified in the transmit beamforming configuration, and receive one or more communications (e.g., uplink communications and/or downlink communications) via the configured one or more Tx beams.

As another example, if a repeater configuration indicates that the repeater is to perform one or more measurements during a time duration indicated in the repeater configuration, the repeater may perform the one or more measurements for one or more uplink communications received from the UE and/or one or more downlink communications received from the BS during the time duration. As another example, if a repeater configuration indicates that the repeater is to transmit one or more reference signals during a time duration indicated in the repeater configuration, the repeater may transmit the one or more reference signals to the BS and/or the UE during the time duration.

As another example, if a repeater configuration indicates a gain parameter that is to be used during a time duration indicated in the repeater configuration, the repeater may relay or forward an uplink communication during the time duration by amplifying the received RF analog signal carrying the uplink communication based at least in part on the gain parameter, and/or may relay or forward a downlink communication during the time duration by amplifying the received RF analog signal carrying the downlink communication based at least in part on the gain parameter.

Figure 6C:
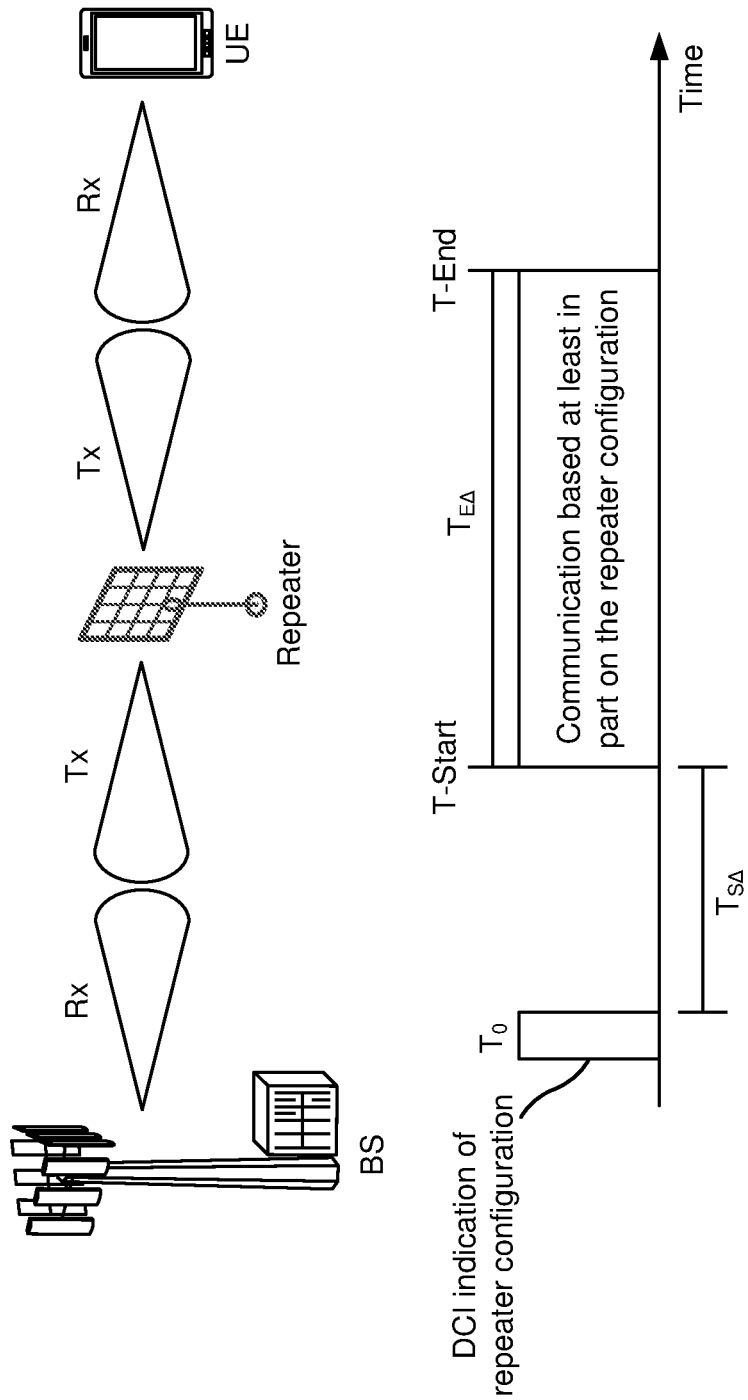
Figure 6D:
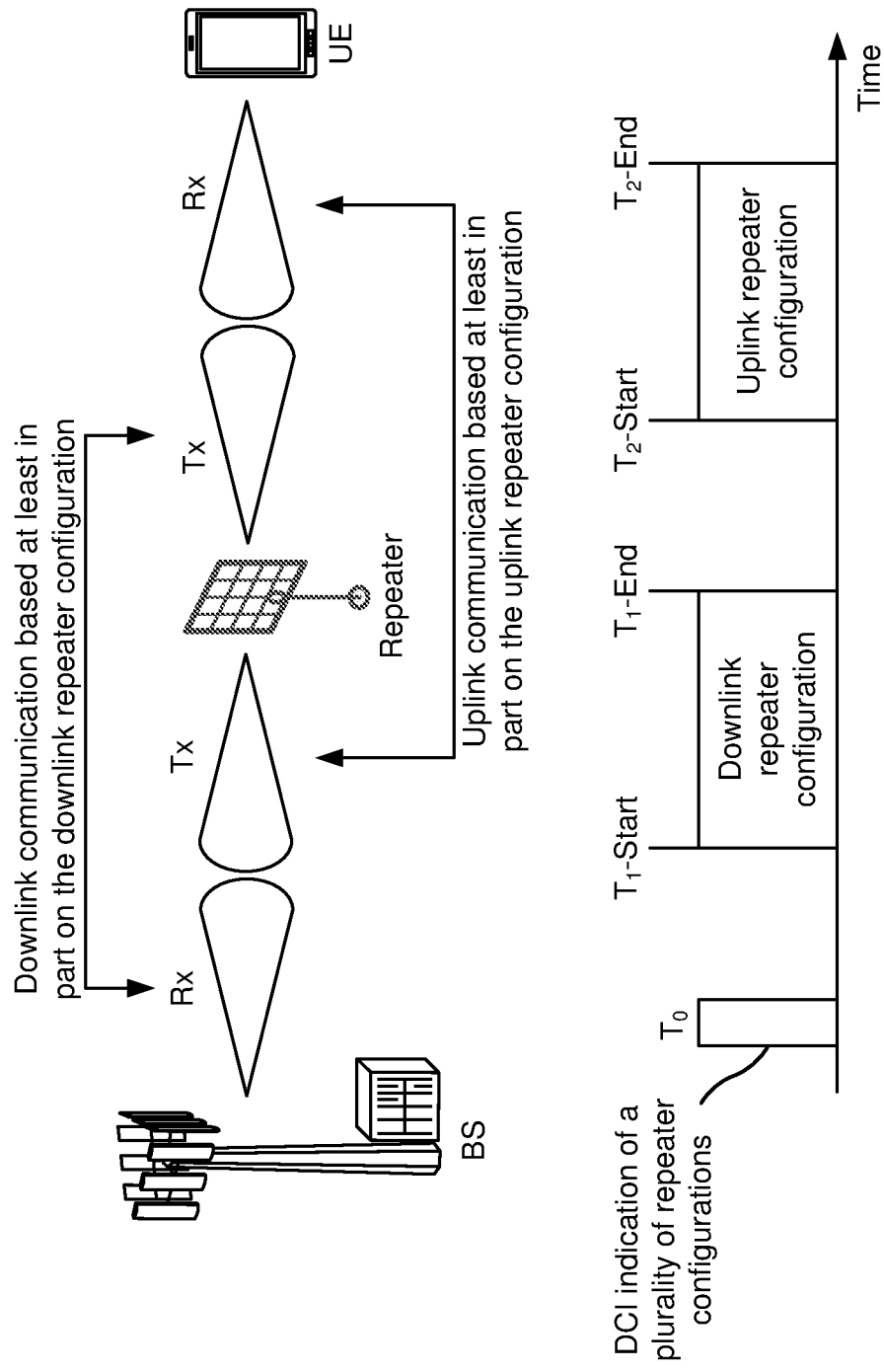
Figure 6E:
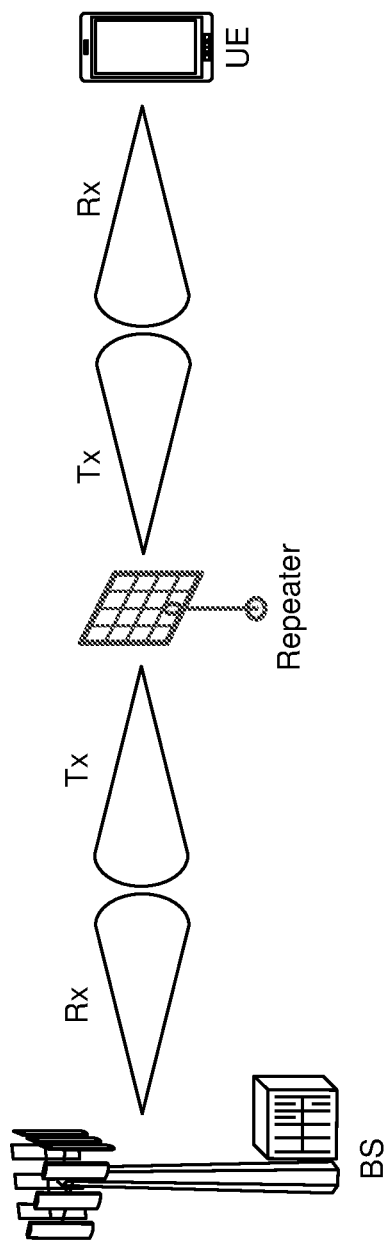
Figure 6E:
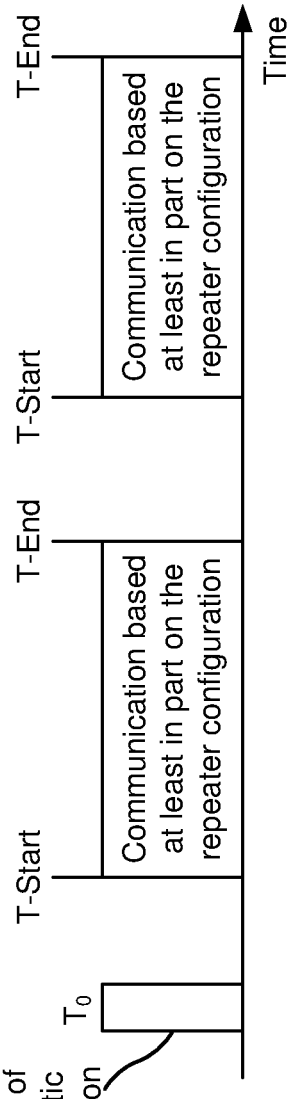

FIGS. 6C-6E illustrate various example repeater configurations. In some aspects, the example repeater configurations may be implemented as separate repeater configurations, may be combined into a single repeater configuration, may be used to configure a repeater with a combination of a plurality of repeater configurations, and/or the like. Moreover, other repeater configurations may be configured and/or combined for use by the repeater. As shown in FIG. 6C, in some aspects, an example repeater configuration may include a repeater configuration that the BS transmits to the repeater in a downlink control information (DCI) communication. In some aspects, the example repeater configuration may indicate that the repeater is to communicate with the BS and/or the UE via an uplink path and/or a downlink path using one or more Tx and/or Rx beams.

As further shown in FIG. 6C, in some aspects, the DCI communication carrying the repeater configuration may be transmitted by the BS or received by the repeater at a time $T_0$. In some aspects, the example repeater configuration may indicate a starting time (T-Start) of a time duration during which the repeater is to communicate with the BS and/or the UE based at least in part on one or more configuration parameters indicated in the repeater configuration. For example, the example repeater configuration may explicitly specify T-Start or implicitly specify T-Start by specifying a timing offset ($T_{SA}$) relative to $T_0$. Moreover, the example repeater configuration may indicate an ending time (T-End) of the time duration. For example, the example repeater configuration may explicitly specify T-End or implicitly specify T-End by specifying a timing offset ($T_{EA}$) relative to T-Start.

As shown in FIG. 6D, in some aspects, an example repeater configuration may include a plurality of repeater configurations that the BS transmits to the repeater in a DCI communication. In some aspects, each of the plurality of example repeater configurations may indicate that the repeater is to communicate with the BS and/or the UE via an uplink path and/or a downlink path using one or more Tx and/or Rx beams. For example, an example downlink repeater configuration may indicate that the repeater is to perform downlink communication with the BS and the UE via a downlink path using an Rx beam configured to communicate with the BS and a Tx beam configured to communicate with the UE. As another example, an example uplink repeater configuration may indicate that the repeater is to perform uplink communication with the BS and the UE via an uplink path using a Tx beam configured to communicate with the BS and an Rx beam configured to communicate with the UE.

As further shown in FIG. 6D, in some aspects, the DCI communication carrying the plurality of example repeater configurations may be transmitted by the BS or received by the repeater at a time $T_0$. The example downlink repeater configuration may indicate a starting time ($T_1$-Start) of a first time duration during which the repeater is to communicate with the BS and/or the UE based at least in part on one or more configuration parameters indicated in the example downlink repeater configuration. For example, the example downlink repeater configuration may explicitly specify $T_1$-Start or implicitly specify $T_1$-Start by specifying a timing offset relative to $T_0$. Moreover, the example downlink repeater configuration may indicate an ending time ($T_1$-End) of the first time duration. For example, the example downlink repeater configuration may explicitly specify $T_1$-End or implicitly specify $T_1$-End by specifying a timing offset relative to $T_1$-Start.

The example uplink repeater configuration may indicate a starting time ($T_2$-Start) of a second time duration during which the repeater is to communicate with the BS and/or the UE based at least in part on one or more configuration parameters indicated in the example uplink repeater configuration. For example, the example uplink repeater configuration may explicitly specify $T_2$-Start or implicitly specify $T_2$-Start by specifying a timing offset relative to $T_0$, $T_1$-End, and/or the like. Moreover, the example uplink repeater configuration may indicate an ending time ($T_2$-End) of the second time duration. For example, the example uplink repeater configuration may explicitly specify $T_2$-End or implicitly specify $T_2$-End by specifying a timing offset relative to $T_2$-Start. In some aspects, the BS may configure the first time duration and the second time duration such that the first time duration and the second time duration are non-overlapping.

As shown in FIG. 6E, in some aspects, an example repeater configuration may include a periodic or semi-static repeater configuration that the BS transmits to the repeater in a medium access control (MAC) control element (MAC-CE) communication. In some aspects, the BS may transmit a periodic or semi-static repeater configuration in a radio resource control (RRC) communication. In some aspects, the example periodic or semi-static repeater configuration may indicate that the repeater is to communicate with the BS and/or the UE via an uplink path and/or a downlink path using one or more Tx and/or Rx beams.

As further shown in FIG. 6E, in some aspects, the MAC-CE communication carrying the example periodic or semi-static repeater configuration may be transmitted by the BS or received by the repeater at a time $T_0$. The example periodic or semi-static repeater configuration may indicate a starting time (T-Start) of a time duration during which the repeater is to communicate with the BS and/or the UE based at least in part on one or more configuration parameters indicated in the example periodic or semi-static repeater configuration. For example, the example periodic or semi-static repeater configuration may explicitly specify T-Start or implicitly specify T-Start by specifying a timing offset ($T_{SA}$) relative to $T_0$. Moreover, the example periodic or semi-static repeater configuration may indicate an ending time (T-End) of the time duration. For example, the example periodic or semi-static repeater configuration may explicitly specify T-End or implicitly specify T-End by specifying a timing offset ($T_{EA}$) relative to T-Start. Moreover, the example periodic or semi-static repeater configuration may indicate that the repeater is to communicate with the BS and/or the UE across a plurality of periodically or semi-statically scheduled time durations based at least in part on the one or more configuration parameters indicated in the example periodic or semi-static repeater configuration.

In this way, the BS may configure one or more repeater configurations, based at least in part on which the repeater may communicate with the BS and/or the UE by relaying or forwarding RF analog signals (e.g., RF analog signals carrying uplink communications and/or downlink communications) between the BS and the UE. The BS may transmit an indication of the repeater configuration to the repeater by in-band control signaling. For example, the BS may transmit the indication of the repeater configuration on a control interface associated with the repeater, and the control interface may be carried in a BWP that is included in an operating frequency bandwidth of the repeater. In this way, the repeater configuration permits efficient operation of the repeater while permitting the reduced costs and complexities of the repeater and/or of deploying the repeater in a wireless network.

As indicated above, FIGS. 6A-6E are provided as examples. Other examples may differ from what is described with respect to FIGS. 6A-6E.

Figure 7:
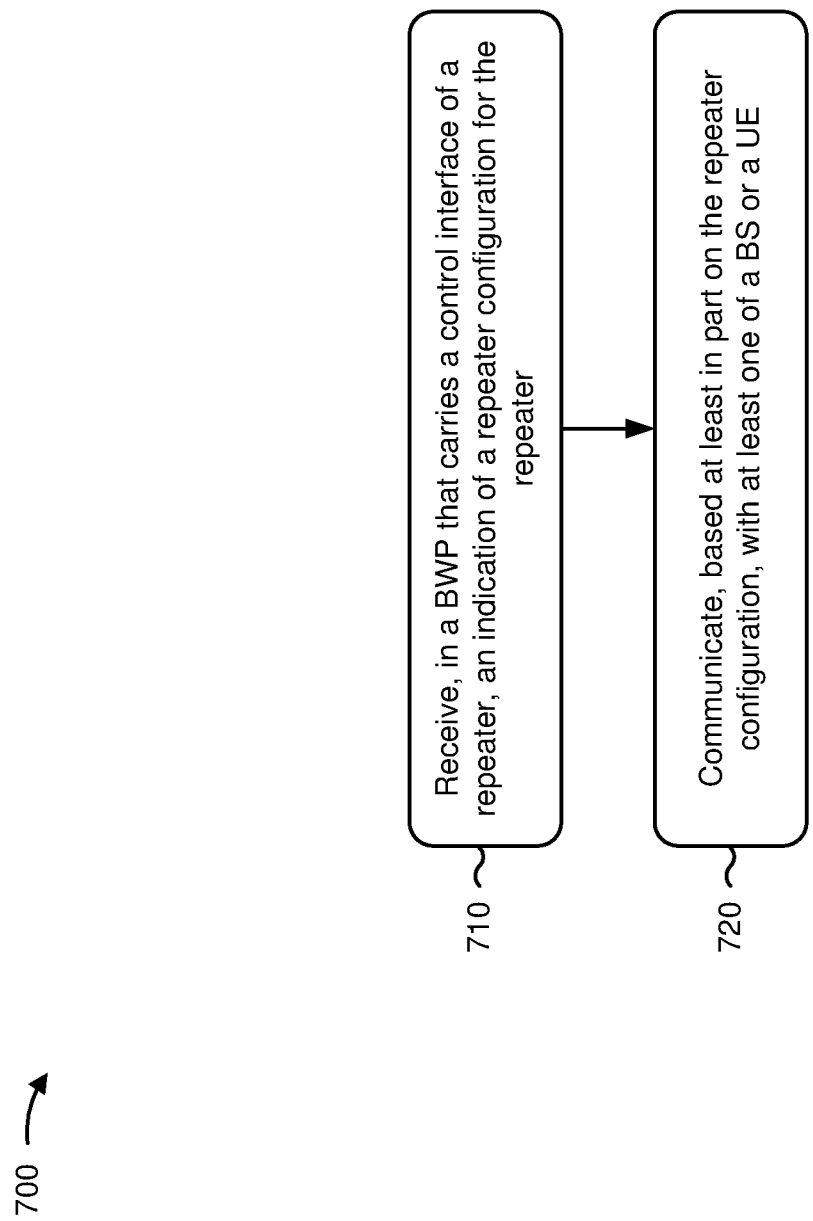
FIG. 7 is a diagram illustrating an example process performed, for example, by a repeater, in accordance with various aspects of the present disclosure.

FIG. 7 is a diagram illustrating an example process 700 performed, for example, by a repeater, in accordance with various aspects of the present disclosure. Example process 700 is an example where a repeater (e.g., repeater 140, repeater 300, and/or the like) performs operations associated with in-band repeater control.

As shown in FIG. 7, in some aspects, process 700 may include receiving, in a BWP that carries a control interface of the repeater, an indication of a repeater configuration for the repeater (block 710). For example, the repeater (e.g., using one or more antenna arrays 310, gain component 320, controller 330, communication component 340, MUX/DEMUX 350, oscillator 360, gain component 370, switch 380, and/or the like) may receive, in a BWP that carries a control interface of the repeater, an indication of a repeater configuration for the repeater, as described above.

As further shown in FIG. 7, in some aspects, process 700 may include communicating, based at least in part on the repeater configuration, with at least one of a BS or a UE (block 720). For example, the repeater (e.g., using one or more antenna arrays 310, gain component 320, controller 330, communication component 340, MUX/DEMUX 350, oscillator 360, gain component 370, switch 380, and/or the like) may communicate, based at least in part on the repeater configuration, with at least one of a BS or a UE, as described above.

Process 700 may include additional aspects, such as any single aspect or any combination of aspects described below and/or in connection with one or more other processes described elsewhere herein.

In a first aspect, the repeater is associated with an RNTI that is different from an RNTI associated with the UE, the RNTI is configured by the BS prior to communicating with the repeater, and receiving the indication of the repeater configuration comprises receiving the indication of the repeater configuration in a signaling communication and descrambling the signaling communication based at least in part on the RNTI associated with the repeater. In a second aspect, alone or in combination with the first aspect, the repeater configuration indicates a time duration, and communicating with at least one of the BS or the UE comprises communicating with at least one of the BS or the UE during the time duration and based at least in part on the repeater configuration.

In a third aspect, alone or in combination with one or more of the first and second aspects, the repeater configuration indicates a starting time and an ending time of the time duration, the starting time is explicitly indicated in the repeater configuration or implicitly indicated in the repeater configuration by a first timing offset relative to a time at which a signaling communication identifying the repeater configuration was transmitted, and the ending time is explicitly indicated in the repeater configuration or implicitly indicated in the repeater configuration by a second timing offset relative to the starting time. In a fourth aspect, alone or in combination with one or more of the first through third aspects, the starting time is based at least in part on a capability parameter associated with the repeater.

In a fifth aspect, alone or in combination with one or more of the first through fourth aspects, the repeater configuration indicates at least one of: the repeater is to power on one or more components of the repeater during the time duration, the repeater is to power off one or more components of the repeater during the time duration, the repeater is to activate an uplink path during the time duration, the repeater is to activate a downlink path during the time duration, a gain parameter to be used during the time duration, a transmit beamforming configuration during the time duration, a receive beamforming configuration during the time duration, the repeater is to perform one or more measurements during the time duration, or the repeater is to transmit one or more reference signals during the time duration.

In a sixth aspect, alone or in combination with one or more of the first through fifth aspects, the repeater configuration indicates that the repeater is to activate an uplink path during the time duration, and communicating with at least one of the BS or the UE comprises at least one of transmitting, based at least in part on the repeater configuration, one or more uplink communications to the BS during the time duration, or receiving, based at least in part on the repeater configuration, one or more uplink communications from the UE during the time duration. In a seventh aspect, alone or in combination with one or more of the first through sixth aspects, the repeater configuration indicates that the repeater is to activate a downlink path during the time duration, and communicating with at least one of the BS or the UE comprises at least one of transmitting, based at least in part on the repeater configuration, one or more downlink communications to the UE during the time duration, or receiving, based at least in part on the repeater configuration, one or more downlink communications from the BS during the time duration.

In an eighth aspect, alone or in combination with one or more of the first through seventh aspects, the repeater configuration indicates a transmit beamforming configuration, and communicating with at least one of the BS or the UE comprises at least one of transmitting, based at least in part on the transmit beamforming configuration, one or more uplink communications to the BS during the time duration, or transmitting, based at least in part on the transmit beamforming configuration, one or more downlink communications to the UE during the time duration. In a ninth aspect, alone or in combination with one or more of the first through eighth aspects, the transmit beamforming configuration indicates at least one of a codeword index included in a beamforming codebook, one or more beamforming weights, or adjustments to one or more beamforming weights.

In a tenth aspect, alone or in combination with one or more of the first through ninth aspects, the repeater configuration indicates a receive beamforming configuration, and communicating with at least one of the BS or the UE comprises at least one of receiving, based at least in part on the receive beamforming configuration, one or more uplink communications from the UE during the time duration, or receiving, based at least in part on the receive beamforming configuration, one or more downlink communications from the BS during the time duration. In an eleventh aspect, alone or in combination with one or more of the first through tenth aspects, the receive beamforming configuration indicates at least one of a codeword index included in a beamforming codebook, one or more beamforming weights, or adjustments to one or more beamforming weights.

In a twelfth aspect, alone or in combination with one or more of the first through eleventh aspects, the repeater configuration indicates that the repeater is to perform one or more measurements during the time duration, and process 700 further comprises performing, based at least in part on the repeater configuration, one or more measurements of one or more uplink communications received from the UE during the time duration, or performing, based at least in part on the repeater configuration, one or more measurements of one or more downlink communications received from the BS during the time duration.

In a thirteenth aspect, alone or in combination with one or more of the first through twelfth aspects, the repeater configuration indicates a gain parameter, and communicating with at least one of the BS or the UE comprises at least one of transmitting, based at least in part on the gain parameter, one or more uplink communications to the BS during the time duration, or transmitting, based at least in part on the gain parameter, one or more downlink communications to the BS during the time duration. In a fourteenth aspect, alone or in combination with one or more of the first through thirteenth aspects, the repeater configuration indicates that the repeater is to transmit one or more reference signals during the time duration, and communicating with at least one of the BS or the UE comprises transmitting, based at least in part on the repeater configuration, one or more reference signals to at least one of the BS or the UE during the time duration.

In a fifteenth aspect, alone or in combination with one or more of the first through fourteenth aspects, the repeater configuration comprises a downlink repeater configuration, process 700 further comprises receiving an indication of an uplink repeater configuration for the repeater, and communicating with at least one of the BS or the UE comprises at least one of receiving one or more downlink communications from the BS or transmitting one or more downlink communications to the UE based at least in part on the downlink repeater configuration and at least one of receiving one or more uplink communications from the UE or transmitting one or more uplink communications to the BS based at least in part on the uplink repeater configuration.

In a sixteenth aspect, alone or in combination with one or more of the first through fifteenth aspects, at least one of receiving one or more downlink communications from the BS or transmitting one or more downlink communications to the UE comprises at least one of receiving one or more downlink communications from the BS or transmitting one or more downlink communications to the UE in a first time duration indicated in the downlink repeater configuration, and at least one of receiving one or more uplink communications from the UE or transmitting one or more uplink communications to the BS comprises at least one of receiving one or more uplink communications from the UE or transmitting one or more uplink communications to the BS in a second time duration indicated in the uplink repeater configuration, the first time duration and the second time duration being non-overlapping time durations.

In a seventeenth aspect, alone or in combination with one or more of the first through sixteenth aspects, receiving the indication of the repeater configuration comprises receiving the indication of the repeater configuration in a signaling communication, and process 700 further comprises transmitting an acknowledgement based at least in part on receiving the signaling communication. In an eighteenth aspect, alone or in combination with one or more of the first through seventeenth aspects, the repeater configuration is included in a plurality of candidate repeater configurations, and receiving the indication of the repeater configuration comprises receiving a signaling communication that indexes into the plurality of candidate repeater configurations to identify the repeater configuration.

In a nineteenth aspect, alone or in combination with one or more of the first through eighteenth aspects, receiving the indication of the repeater configuration comprises receiving the indication of the repeater configuration in at least one of an RRC communication, a MAC-CE communication, or a DCI communication. In a twentieth aspect, alone or in combination with one or more of the first through nineteenth aspects, communicating with at least one of the BS or the UE comprises receiving an RF analog signal from the BS or the UE and forwarding the RF analog signal to the BS or the UE. In a twenty-first aspect, alone or in combination with one or more of the first through twentieth aspects, receiving the indication of the repeater configuration comprises receiving the indication of the repeater configuration in a MAC-CE communication, the repeater configuration comprises a periodic or semi-static repeater configuration, and communicating with at least one of the BS or the UE comprises communicating with at least one of the BS or the UE in a plurality of time durations based at least in part on the periodic or semi-static repeater configuration.

In a twenty-second aspect, alone or in combination with one or more of the first through twenty-first aspects, communicating with at least one of the BS or the UE comprises receiving an RF analog signal from the BS or the UE, performing analog amplification of the RF analog signal, and repeating the RF analog signal to the BS or the UE after performing the analog amplification of the RF analog signal.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
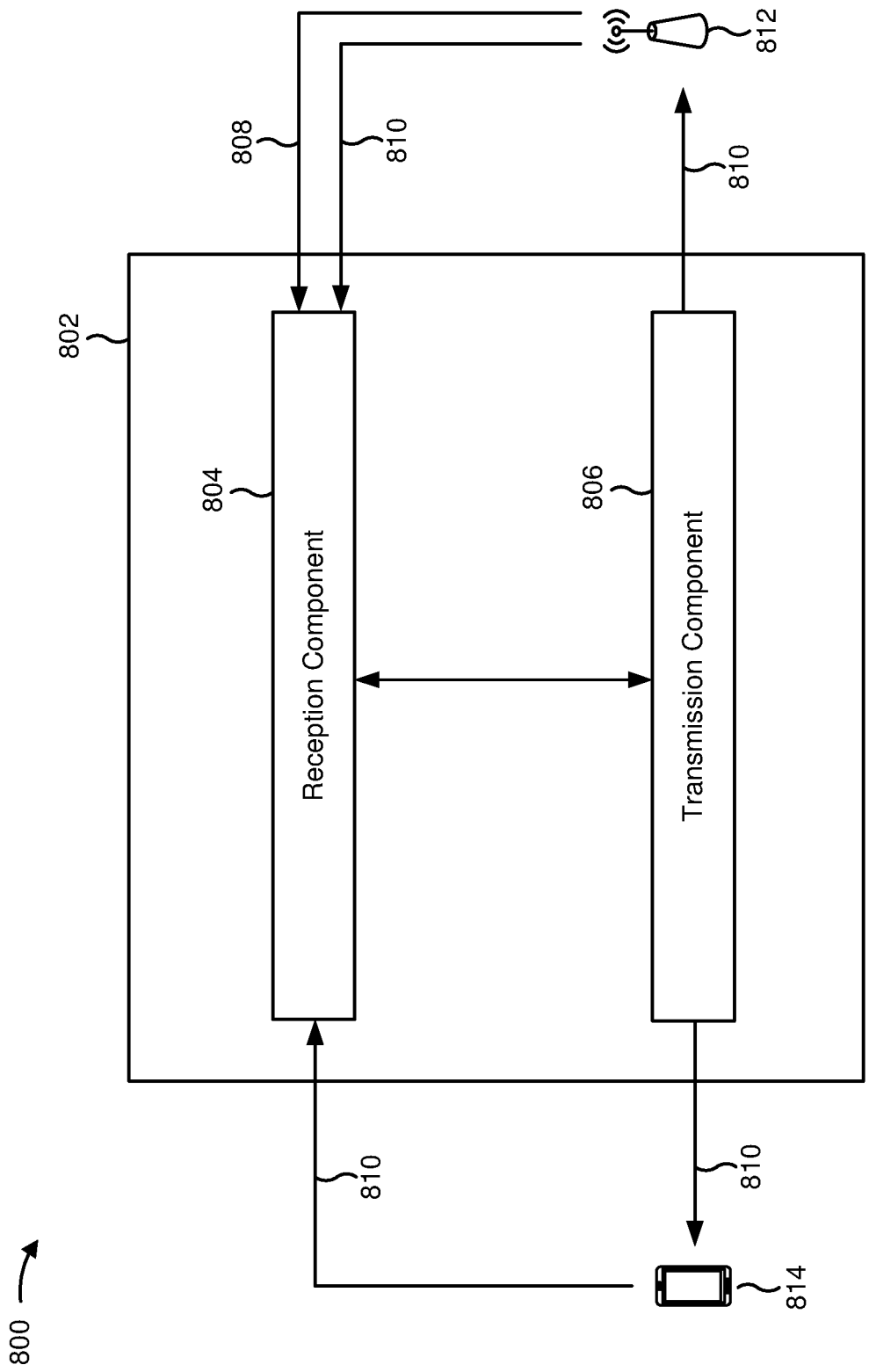
FIG. 8 is a conceptual data flow diagram illustrating an example of a data flow between different modules/means/components in an example apparatus, in accordance with various aspects of the present disclosure.

FIG. 8 is a conceptual data flow diagram illustrating an example 800 of a data flow between different modules/means/components in an example apparatus 802, in accordance with various aspects of the present disclosure. The apparatus 802 may be a repeater (e.g., repeater 140, repeater 300, and/or the like). In some aspects, the apparatus 802 includes a reception component (or module) 804 and a transmission component (or module) 806.

Reception component 804 may receive a signaling communication 808 from a BS 812 (e.g., BS 110). For example, reception component 804 may receive signaling communication 808 in a BWP carrying a control interface associated with apparatus 802. In some aspects, signaling communication 808 may indicate a repeater configuration for apparatus 802. In some aspects, signaling communication 808 may include an RRC communication, a MAC-CE communication, a DCI communication, and/or the like. In some aspects, reception component 804 may include an antenna (e.g., antenna array 310), a communication component (e.g., communication component 340), and/or the like.

In some aspects, apparatus 802 may communicate with BS 812 and/or a UE 814 (e.g., UE 120) based at least in part on the repeater configuration indicated in signaling communication 808. For example, reception component 804 may receive an RF analog signal 810 carrying an uplink communication from UE 814, may receive an RF analog signal 810 carrying a downlink communication from BS 812, and/or the like. As another example, transmission component 806 may transmit an RF analog signal 810 carrying an uplink communication to BS 812, may receive an RF analog signal 810 carrying a downlink communication to UE 814, and/or the like. In some aspects, transmission component 806 may include an antenna (e.g., antenna array 310), a communication component (e.g., communication component 340), and/or the like.

Apparatus 802 may include additional components that perform each of the blocks of the algorithm in the aforementioned process 600 of FIG. 6 and/or the like. Each block in the aforementioned process 700 of FIG. 7 and/or the like may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

The number and arrangement of components shown in FIG. 8 are provided as an example. In practice, there may be additional components, fewer components, different components, or differently arranged components than those shown in FIG. 8. Furthermore, two or more components shown in FIG. 8 may be implemented within a single component, or a single component shown in FIG. 8 may be implemented as multiple, distributed components. Additionally, or alternatively, a set of components (e.g., one or more components) shown in FIG. 8 may perform one or more functions described as being performed by another set of components shown in FIG. 8.

Figure 9:
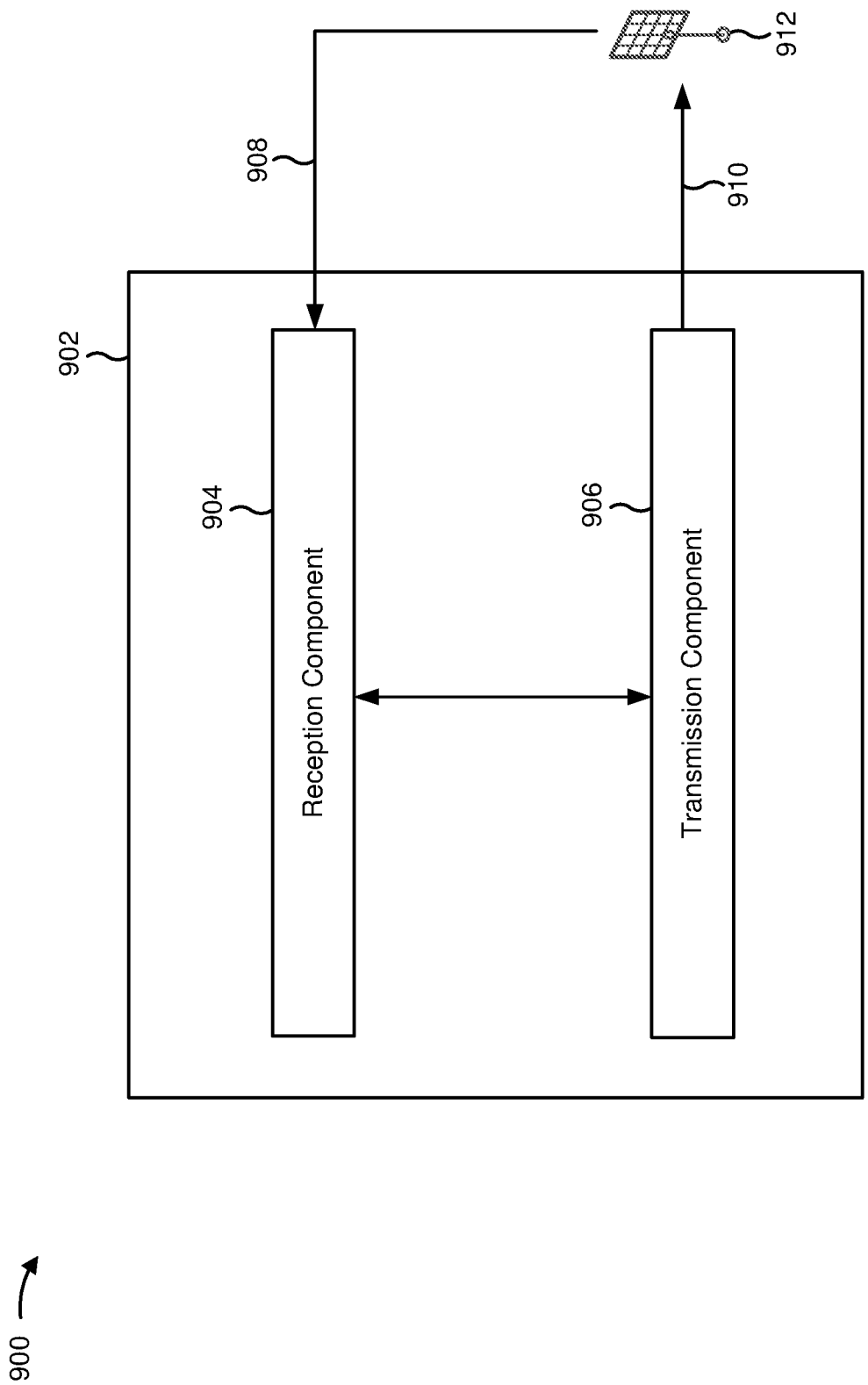
FIGS. 9 and 10 are conceptual data flow diagrams illustrating examples of data flows between different modules/means/components in example apparatuses, in accordance with various aspects of the present disclosure.

FIG. 9 is a conceptual data flow diagram illustrating an example 900 of a data flow between different modules/means/components in an example apparatus 902, in accordance with various aspects of the present disclosure. The apparatus 902 may be a UE (e.g., UE 120). In some aspects, the apparatus 902 includes a reception component (or module) 904 and a transmission component (or module) 906.

Reception component 904 and transmission component 906 may communicate with a repeater 912 (e.g., repeater 140, repeater 300, and/or the like) based at least in part on a repeater configuration that is configured for repeater 912. For example, reception component 904 may receive a downlink communication 908 from repeater 912 during a time period, indicated in the repeater configuration, in which the repeater 912 is to activate a downlink path between the apparatus 902 and a BS (e.g., BS 11). As another example, transmission component 906 may transmit an uplink communication 910 to repeater 912 during a time period, indicated in the repeater configuration, in which the repeater 912 is to activate an uplink path between the apparatus 902 and the BS.

In some aspects, reception component 904 may include an antenna (e.g., antenna 252), a controller/processor (e.g., controller/processor 280), a demodulator (e.g., DEMOD 254), a MIMO detector (e.g., MIMO detector 256), a receive processor (e.g., receive processor 258), and/or the like. In some aspects, transmission component 906 may include an antenna (e.g., antenna 252), a controller/processor (e.g., controller/processor 280), a transmit processor (e.g., transmit processor 264), a TX MIMO processor (e.g., TX MIMO processor 266), a modulator (e.g., MOD 254), and/or the like.

The components may be one or more hardware components specifically configured to carry out the stated processes/algorithm, implemented by a processor configured to perform the stated processes/algorithm, stored within a computer-readable medium for implementation by a processor, or some combination thereof.

The number and arrangement of components shown in FIG. 9 are provided as an example. In practice, there may be additional components, fewer components, different components, or differently arranged components than those shown in FIG. 9. Furthermore, two or more components shown in FIG. 9 may be implemented within a single component, or a single component shown in FIG. 9 may be implemented as multiple, distributed components. Additionally, or alternatively, a set of components (e.g., one or more components) shown in FIG. 9 may perform one or more functions described as being performed by another set of components shown in FIG. 9.

Figure 10:
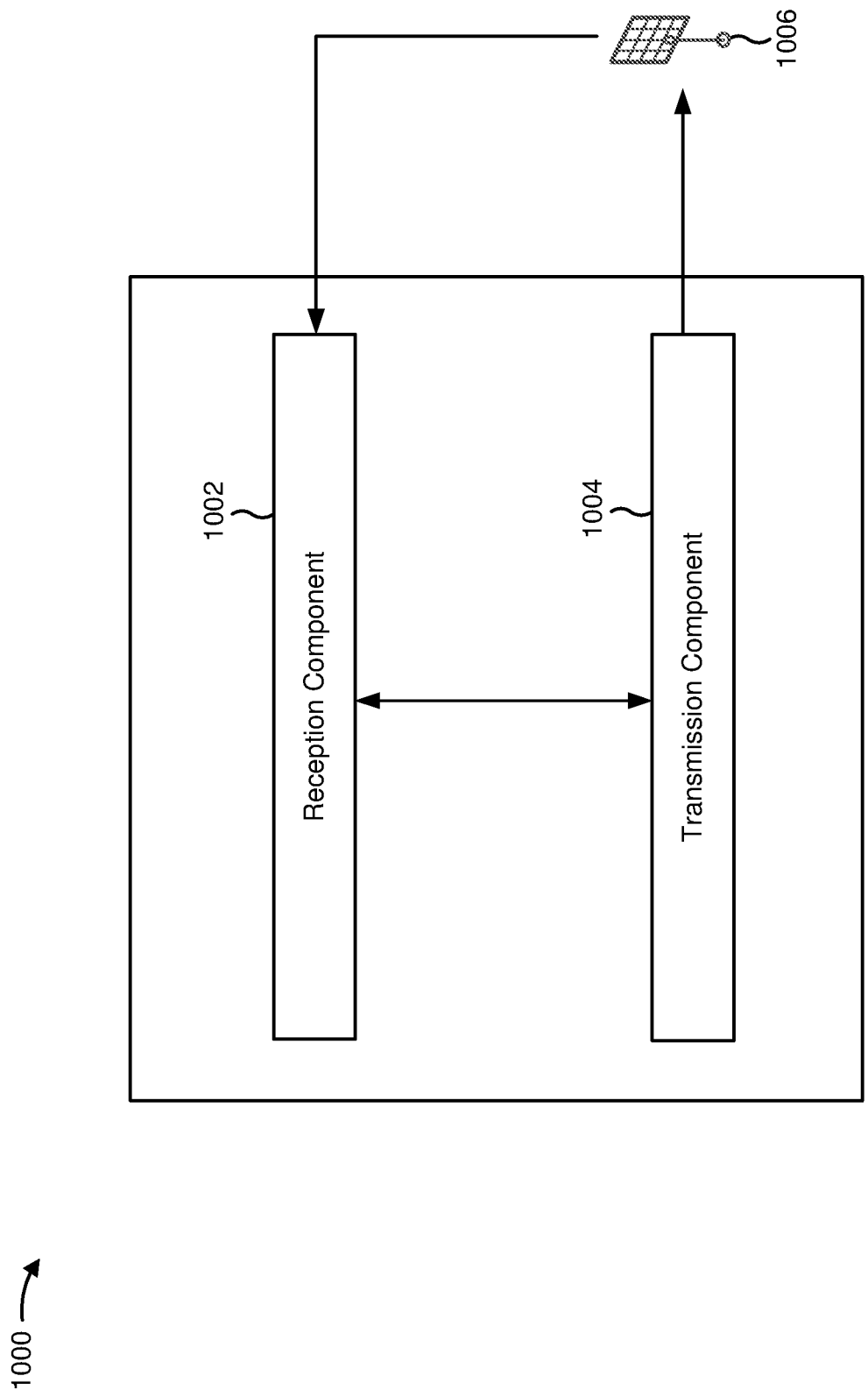

FIG. 10 is a block diagram of an example apparatus 1000 for wireless communication. The apparatus 1000 may be a BS, or a BS may include the apparatus 1000. In some aspects, the apparatus 1000 includes a reception component 1002 and a transmission component 1004, which may be in communication with one another (for example, via one or more buses and/or one or more other components). As shown, the apparatus 1000 may communicate with another apparatus 1006 (such as a repeater 140 or a repeater 300) using the reception component 1002 and the transmission component 1004.

In some aspects, the apparatus 1000 may be configured to perform one or more operations described herein in connection with FIGS. 5A-5C and/or 6A-6E. Additionally or alternatively, the apparatus 1000 may be configured to perform one or more processes described herein, such as process 700 of FIG. 7. In some aspects, the apparatus 1000 and/or one or more components shown in FIG. 10 may include one or more components of the BS described above in connection with FIG. 2. Additionally, or alternatively, one or more components shown in FIG. 10 may be implemented within one or more components described above in connection with FIG. 2. Additionally or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1002 may receive communications, such as reference signals, control information, data communications, or a combination thereof, from the apparatus 1006. The reception component 1002 may provide received communications to one or more other components of the apparatus 1000. In some aspects, the reception component 1002 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1006. In some aspects, the reception component 1002 may include one or more antennas, a demodulator, a MIMO detector, a receive processor, a controller/processor, a memory, or a combination thereof, of the BS described above in connection with FIG. 2.

The transmission component 1004 may transmit communications, such as reference signals, control information, data communications, or a combination thereof, to the apparatus 1006. In some aspects, one or more other components of the apparatus 1006 may generate communications and may provide the generated communications to the transmission component 1004 for transmission to the apparatus 1006. In some aspects, the transmission component 1004 may perform signal processing on the generated communications (such as filtering, amplification, modulation, digital-to-analog conversion, multiplexing, interleaving, mapping, or encoding, among other examples), and may transmit the processed signals to the apparatus 1006. In some aspects, the transmission component 1004 may include one or more antennas, a modulator, a transmit MIMO processor, a transmit processor, a controller/processor, a memory, or a combination thereof, of the BS described above in connection with FIG. 2. In some aspects, the transmission component 1004 may be collocated with the reception component 1002 in a transceiver.

The transmission component 1004 may transmit, in a BWP that carries a control interface of the apparatus 1006, an indication of a repeater configuration for the apparatus 1006. The reception component 1002 and/or the transmission component 1004 may communicate, based at least in part on the repeater configuration, with the apparatus 1006. In some aspects, the reception component 1002 and/or the transmission component 1004 may include one or more antennas, a demodulator, a MIMO detector, a receive processor, a modulator, a transmit MIMO processor, a transmit processor, a controller/processor, a memory, or a combination thereof, of the BS 110 described above in connection with FIG. 2.

The reception component 1002 and/or the transmission component 1004 may a memory. In some aspects, the reception component 1002 and/or the transmission component 100 may include one or more antennas, a demodulator, a MIMO detector, a receive processor, a modulator, a TX MIMO processor, a transmit processor, a controller/processor, a memory, or a combination thereof, of the BS described above in connection with FIG. 2. The reception component 1002 and/or the transmission component 1004 may one or more processors operatively coupled to the memory, the memory and the one or more processors configured to communicate based at least in part on a repeater configuration.

The number and arrangement of components shown in FIG. 10 are provided as an example. In practice, there may be additional components, fewer components, different components, or differently arranged components than those shown in FIG. 10. Furthermore, two or more components shown in FIG. 10 may be implemented within a single component, or a single component shown in FIG. 10 may be implemented as multiple, distributed components. Additionally or alternatively, a set of (one or more) components shown in FIG. 10 may perform one or more functions described as being performed by another set of components shown in FIG. 10.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software.

As used herein, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication, comprising:
   receiving, in a bandwidth part (BWP) that carries a control interface of a repeater, an indication of a repeater configuration for the repeater,
      wherein the BWP is included in an operating frequency of the repeater, and
      wherein the control interface is included in at least a portion of a contiguous set of physical resource blocks of the BWP and comprises a communication interface between a wireless communication device and a user equipment (UE), wherein the communication interface is configured to carry control communications between the wireless communication device and the UE; and
   communicating, based at least in part on the repeater configuration, with at least one of the wireless communication device or the UE.

2. The method of claim 1, wherein communicating with at least one of the wireless communication device or the UE comprises:
   receiving a radio frequency (RF) analog signal from the wireless communication device or the UE; and
   forwarding the RF analog signal to the wireless communication device or the UE.

3. The method of claim 1, wherein communicating with at least one of the wireless communication device or the UE comprises:
   receiving a radio frequency (RF) analog signal from the wireless communication device or the UE;
   performing analog amplification of the RF analog signal; and
   repeating the RF analog signal to the wireless communication device or the UE after performing the analog amplification of the RF analog signal.

4. The method of claim 1, wherein the repeater is associated with a radio network temporary identifier (RNTI) that is different from an RNTI associated with the UE;
   wherein the RNTI is configured by the wireless communication device prior to communicating with the repeater; and
   wherein receiving the indication of the repeater configuration comprises:
      receiving the indication of the repeater configuration in a signaling communication via the control interface in the BWP; and
      descrambling the signaling communication based at least in part on the RNTI associated with the repeater.

5. The method of claim 1, wherein the repeater configuration indicates a time duration; and
   wherein communicating with at least one of the wireless communication device or the UE comprises:
      communicating with at least one of the wireless communication device or the UE during the time duration and based at least in part on the repeater configuration.

6. The method of claim 5, wherein the repeater configuration indicates a starting time and an ending time of the time duration;

wherein the starting time is explicitly indicated in the repeater configuration or implicitly indicated in the repeater configuration by a first timing offset relative to a time at which a signaling communication identifying the repeater configuration was transmitted; and wherein the ending time is explicitly indicated in the repeater configuration or implicitly indicated in the repeater configuration by a second timing offset relative to the starting time.

7. The method of claim 6, wherein the starting time is based at least in part on a capability parameter associated with the repeater.

8. The method of claim 5, wherein the repeater configuration indicates at least one of:
the repeater is to power on one or more components of the repeater during the time duration,
the repeater is to power off one or more components of the repeater during the time duration,
the repeater is to activate an uplink path during the time duration,
the repeater is to activate a downlink path during the time duration,
a gain parameter to be used during the time duration,
a transmit beamforming configuration during the time duration,
a receive beamforming configuration during the time duration,
the repeater is to perform one or more measurements during the time duration, or
the repeater is to transmit one or more reference signals during the time duration.

9. The method of claim 5, wherein the repeater configuration indicates that the repeater is to activate an uplink path during the time duration; and
wherein communicating with at least one of the wireless communication device or the UE comprises at least one of:
transmitting, based at least in part on the repeater configuration, one or more uplink communications to the wireless communication device during the time duration, or
receiving, based at least in part on the repeater configuration, one or more uplink communications from the UE during the time duration.

10. The method of claim 5, wherein the repeater configuration indicates that the repeater is to activate a downlink path during the time duration; and
wherein communicating with at least one of the wireless communication device or the UE comprises at least one of:
transmitting, based at least in part on the repeater configuration, one or more downlink communications to the UE during the time duration, or
receiving, based at least in part on the repeater configuration, one or more downlink communications from the wireless communication device during the time duration.

11. The method of claim 5, wherein the repeater configuration indicates a transmit beamforming configuration; and
wherein communicating with at least one of the wireless communication device or the UE comprises at least one of:
transmitting, based at least in part on the transmit beamforming configuration, one or more uplink communications to the wireless communication device during the time duration, or
transmitting, based at least in part on the transmit beamforming configuration, one or more downlink communications to the UE during the time duration.

12. The method of claim 11, wherein the transmit beamforming configuration indicates at least one of:
a codeword index included in a beamforming codebook,
one or more beamforming weights, or
adjustments to one or more beamforming weights.

13. The method of claim 5, wherein the repeater configuration indicates a receive beamforming configuration; and
wherein communicating with at least one of the wireless communication device or the UE comprises at least one of:
receiving, based at least in part on the receive beamforming configuration, one or more uplink communications from the UE during the time duration, or
receiving, based at least in part on the receive beamforming configuration, one or more downlink communications from the wireless communication device during the time duration.

14. The method of claim 13, wherein the receive beamforming configuration indicates at least one of:
a codeword index included in a beamforming codebook,
one or more beamforming weights, or
adjustments to one or more beamforming weights.

15. The method of claim 5, wherein the repeater configuration indicates that the repeater is to perform one or more measurements during the time duration; and
wherein the method further comprises:
performing, based at least in part on the repeater configuration, one or more measurements of one or more uplink communications received from the UE during the time duration, or
performing, based at least in part on the repeater configuration, one or more measurements of one or more downlink communications received from the wireless communication device during the time duration.

16. The method of claim 5, wherein the repeater configuration indicates a gain parameter; and
wherein communicating with at least one of the wireless communication device or the UE comprises at least one of:
transmitting, based at least in part on the gain parameter, one or more uplink communications to the wireless communication device during the time duration, or
transmitting, based at least in part on the gain parameter, one or more downlink communications to the wireless communication device during the time duration.

17. The method of claim 5, wherein the repeater configuration indicates that the repeater is to transmit one or more reference signals during the time duration; and
wherein communicating with at least one of the wireless communication device or the UE comprises:
transmitting, based at least in part on the repeater configuration, one or more reference signals to at least one of the wireless communication device or the UE during the time duration.

18. The method of claim 1, wherein the repeater configuration comprises:
a downlink repeater configuration;
wherein the method further comprises:
receiving an indication of an uplink repeater configuration for the repeater; and wherein communicating with at least one of the wireless communication device or the UE comprises:
at least one of receiving one or more downlink communications from the wireless communication device or transmitting one or more downlink communications to the UE based at least in part on the downlink repeater configuration; and
at least one of receiving one or more uplink communications from the UE or transmitting one or more uplink communications to the wireless communication device based at least in part on the uplink repeater configuration.

19. The method of claim 18, wherein at least one of receiving one or more downlink communications from the wireless communication device or transmitting one or more downlink communications to the UE comprises:
at least one of receiving one or more downlink communications from the wireless communication device or transmitting one or more downlink communications to the UE in a first time duration indicated in the downlink repeater configuration; and
wherein at least one of receiving one or more uplink communications from the UE or transmitting one or more uplink communications to the wireless communication device comprises:
at least one of receiving one or more uplink communications from the UE or transmitting one or more uplink communications to the wireless communication device in a second time duration indicated in the uplink repeater configuration,
wherein the first time duration and the second time duration are non-overlapping time durations.

20. The method of claim 1, wherein receiving the indication of the repeater configuration comprises:
receiving the indication of the repeater configuration in a signaling communication via the control interface in the BWP; and
wherein the method further comprises:
transmitting an acknowledgement based at least in part on receiving the signaling communication.

21. The method of claim 1, wherein the repeater configuration is included in a plurality of candidate repeater configurations; and
wherein receiving the indication of the repeater configuration comprises:
receiving a signaling communication that indexes into the plurality of candidate repeater configurations to identify the repeater configuration.

22. The method of claim 1, wherein receiving the indication of the repeater configuration comprises:
receiving the indication of the repeater configuration in at least one of:
a radio resource control (RRC) communication,
a medium access control (MAC) control element (MAC-CE) communication, or
a downlink control information (DCI) communication.

23. The method of claim 1, wherein receiving the indication of the repeater configuration comprises:
receiving the indication of the repeater configuration in a medium access control (MAC) control element (MAC-CE) communication;
wherein the repeater configuration comprises a periodic or semi-static repeater configuration; and
wherein communicating with at least one of the wireless communication device or the UE comprises:
communicating with at least one of the wireless communication device or the UE in a plurality of time durations based at least in part on the periodic or semi-static repeater configuration.

24. A repeater for wireless communication, comprising:
a memory; and
one or more processors coupled to the memory, the one or more processors configured to:
receive, in a bandwidth part (BWP) that carries a control interface of the repeater, an indication of a repeater configuration for the repeater,
wherein the BWP is included in an operating frequency of the repeater, and
wherein the control interface is included in at least a portion of a contiguous set of physical resource blocks of the BWP and comprises a communication interface between a wireless communication device and a user equipment (UE), wherein the communication interface is configured to carry control communications between the wireless communication device and the UE; and
communicate, based at least in part on the repeater configuration, with at least one of the wireless communication device or the UE.

25. The repeater of claim 24, wherein the one or more processors, when communicating with at least one of the wireless communication device or the UE, are configured to:
receive a radio frequency (RF) analog signal from the wireless communication device or the UE; and
forwarding the RF analog signal to the wireless communication device or the UE.

26. The repeater of claim 24, wherein the one or more processors, when communicating with at least one of the wireless communication device or the UE, are configured to:
receive a radio frequency (RF) analog signal from the wireless communication device or the UE;
perform analog amplification of the RF analog signal; and
repeat the RF analog signal to the wireless communication device or the UE after performing the analog amplification of the RF analog signal.

27. The repeater of claim 24, wherein the repeater configuration indicates a time duration; and
wherein the one or more processors, when communicating with at least one of the wireless communication device or the UE, are configured to:
communicate with at least one of the wireless communication device or the UE during the time duration and based at least in part on the repeater configuration.

28. The repeater of claim 27, wherein the repeater configuration indicates a starting time and an ending time of the time duration;
wherein the starting time is explicitly indicated in the repeater configuration or implicitly indicated in the repeater configuration by a first timing offset relative to a time at which a signaling communication identifying the repeater configuration was transmitted; and
wherein the ending time is explicitly indicated in the repeater configuration or implicitly indicated in the repeater configuration by a second timing offset relative to the starting time.

29. The repeater of claim 28, wherein the starting time is based at least in part on a capability parameter associated with the repeater.

30. The repeater of claim 27, wherein the repeater configuration indicates at least one of:
the repeater is to power on one or more components of the repeater during the time duration, the repeater is to power off one or more components of the repeater during the time duration, the repeater is to activate an uplink path during the time duration, the repeater is to activate a downlink path during the time duration, a gain parameter to be used during the time duration, a transmit beamforming configuration during the time duration, a receive beamforming configuration during the time duration, the repeater is to perform one or more measurements during the time duration, or the repeater is to transmit one or more reference signals during the time duration.

31. The repeater of claim 24, wherein the repeater configuration comprises:

a downlink repeater configuration;

wherein the one or more processors are further configured to:

receive an indication of an uplink repeater configuration for the repeater; and wherein the one or more processors, when communicating with at least one of the wireless communication device or the UE, are configured to:

at least one of receive one or more downlink communications from the wireless communication device or transmit one or more downlink communications to the UE based at least in part on the downlink repeater configuration; and at least one of receive one or more uplink communications from the UE or transmit one or more uplink communications to the wireless communication device based at least in part on the uplink repeater configuration.

32. The repeater of claim 31, wherein the one or more processors, when at least one of receiving one or more downlink communications from the wireless communication device or transmitting one or more downlink communications to the UE, are configured to:

at least one of receive one or more downlink communications from the wireless communication device or transmit one or more downlink communications to the UE in a first time duration indicated in the downlink repeater configuration; and wherein the one or more processors, when at least one of receiving one or more uplink communications from the UE or transmitting one or more uplink communications to the wireless communication device, are configured to:

at least one of receive one or more uplink communications from the UE or transmit one or more uplink communications to the wireless communication device in a second time duration indicated in the uplink repeater configuration, wherein the first time duration and the second time duration are non-overlapping time durations.

33. The repeater of claim 24, wherein the one or more processors, when receiving the indication of the repeater configuration, are configured to:

receive the indication of the repeater configuration in a medium access control (MAC) control element (MAC-CE) communication;

wherein the repeater configuration comprises a periodic or semi-static repeater configuration; and wherein the one or more processors, when communicating with at least one of the wireless communication device or the UE, are configured to:

communicate with at least one of the wireless communication device or the UE in a plurality of time durations based at least in part on the periodic or semi-static repeater configuration.

34. A non-transitory computer-readable medium storing one or more instructions for wireless communication, the one or more instructions comprising:

one or more instructions that, when executed by one or more processors of a repeater, cause the one or more processors to:

receive, in a bandwidth part (BWP) that carries a control interface of the repeater, an indication of a repeater configuration for the repeater, wherein the BWP is included in an operating frequency of the repeater, and wherein the control interface is included in at least a portion of a contiguous set of physical resource blocks of the BWP and comprises a communication interface between a wireless communication device and a user equipment (UE), wherein the communication interface is configured to carry control communications between the wireless communication device and the UE; and communicate, based at least in part on the repeater configuration, with at least one of the wireless communication device or the UE.

35. The non-transitory computer-readable medium of claim 34, wherein the one or more instructions, that cause the one or more processors to communicate with at least one of the wireless communication device or the UE, cause the one or more processors to:

receive a radio frequency (RF) analog signal from the wireless communication device or the UE; and forward the RF analog signal to the wireless communication device or the UE.

36. The non-transitory computer-readable medium of claim 34, wherein the one or more instructions, that cause the one or more processors to communicate with at least one of the wireless communication device or the UE, cause the one or more processors to:

receive a radio frequency (RF) analog signal from the wireless communication device or the UE;

perform analog amplification of the RF analog signal; and repeat the RF analog signal to the wireless communication device or the UE after performing the analog amplification of the RF analog signal.

37. The non-transitory computer-readable medium of claim 34, wherein the repeater configuration indicates a time duration; and wherein the one or more instructions, that cause the one or more processors to communicate with at least one of the wireless communication device or the UE, cause the one or more processors to:

communicate with at least one of the wireless communication device or the UE during the time duration and based at least in part on the repeater configuration.

38. The non-transitory computer-readable medium of claim 37, wherein the repeater configuration indicates a starting time and an ending time of the time duration;

wherein the starting time is explicitly indicated in the repeater configuration or implicitly indicated in the repeater configuration by a first timing offset relative to a time at which a signaling communication identifying the repeater configuration was transmitted; and wherein the ending time is explicitly indicated in the repeater configuration or implicitly indicated in the repeater configuration by a second timing offset relative to the starting time.

39. The non-transitory computer-readable medium of claim 38, wherein the starting time is based at least in part on a capability parameter associated with the repeater.

40. The non-transitory computer-readable medium of claim 37, wherein the repeater configuration indicates at least one of:
the repeater is to power on one or more components of the repeater during the time duration,
the repeater is to power off one or more components of the repeater during the time duration,
the repeater is to activate an uplink path during the time duration,
the repeater is to activate a downlink path during the time duration,
a gain parameter to be used during the time duration,
a transmit beamforming configuration during the time duration,
a receive beamforming configuration during the time duration,
the repeater is to perform one or more measurements during the time duration, or
the repeater is to transmit one or more reference signals during the time duration.

41. The non-transitory computer-readable medium of claim 34, wherein the repeater configuration comprises:
a downlink repeater configuration;
wherein the one or more instructions, when executed by the one or more processors, further cause the one or more processors to:
receive an indication of an uplink repeater configuration for the repeater; and
wherein the one or more instructions, that cause the one or more processors to communicate with at least one of the wireless communication device or the UE, cause the one or more processors to:
at least one of receive one or more downlink communications from the BS or transmit one or more downlink communications to the UE based at least in part on the downlink repeater configuration; and
at least one of receive one or more uplink communications from the UE or transmit one or more uplink communications to the wireless communication device based at least in part on the uplink repeater configuration.

42. The non-transitory computer-readable medium of claim 41, wherein the one or more instructions, that cause the one or more processors to at least one of receive one or more downlink communications from the wireless communication device or transmit one or more downlink communications to the UE, are to:
at least one of receive one or more downlink communications from the wireless communication device or transmit one or more downlink communications to the UE in a first time duration indicated in the downlink repeater configuration; and
wherein the one or more instructions, that cause the one or more processors to at least one of receive one or more uplink communications from the UE or transmit one or more uplink communications to the wireless communication device, are configured to:
at least one of receive one or more uplink communications from the UE or transmit one or more uplink communications to the wireless communication device in a second time duration indicated in the uplink repeater configuration,
wherein the first time duration and the second time duration are non-overlapping time durations.

43. The non-transitory computer-readable medium of claim 34, wherein the one or more instructions, that cause the one or more processors to receive the indication of the repeater configuration, cause the one or more processors to:
receive the indication of the repeater configuration in a medium access control (MAC) control element (MAC-CE) communication;
wherein the repeater configuration comprises a periodic or semi-static repeater configuration; and
wherein the one or more instructions, that cause the one or more processors to communicate with at least one of the wireless communication device or the UE, cause the one or more processors to:
communicate with at least one of the wireless communication device or the UE in a plurality of time durations based at least in part on the periodic or semi-static repeater configuration.

44. An apparatus for wireless communication, comprising:
means for receiving, in a bandwidth part (BWP) that carries a control interface of the apparatus, an indication of a repeater configuration for the apparatus,
wherein the BWP is included in an operating frequency of the apparatus, and
wherein the control interface is included in at least a portion of a contiguous set of physical resource blocks of the BWP and comprises a communication interface between a wireless communication device and a user equipment (UE), wherein the communication interface is configured to carry control communications between the wireless communication device and the UE; and
means for communicating, based at least in part on the repeater configuration, with at least one of the wireless communication device or the UE.

45. The apparatus of claim 44, wherein the means for communicating with at least one of the BS or the UE comprises:
means for receiving a radio frequency (RF) analog signal from the wireless communication device or the UE; and
means for forwarding the RF analog signal to the wireless communication device or the UE.

46. The apparatus of claim 44, wherein the means for communicating with at least one of the wireless communication device or the UE comprises:
means for receiving a radio frequency (RF) analog signal from the wireless communication device or the UE;
means for performing analog amplification of the RF analog signal; and
means for repeating the RF analog signal to the wireless communication device or the UE after performing the analog amplification of the RF analog signal.

47. The apparatus of claim 44, wherein the repeater configuration indicates a time duration; and
wherein the means for communicating with at least one of the wireless communication device or the UE comprises:
means for communicating with at least one of the wireless communication device or the UE during the time duration and based at least in part on the repeater configuration.

48. The apparatus of claim 47, wherein the repeater configuration indicates a starting time and an ending time of the time duration;
- wherein the starting time is explicitly indicated in the repeater configuration or implicitly indicated in the repeater configuration by a first timing offset relative to a time at which a signaling communication identifying the repeater configuration was transmitted; and
- wherein the ending time is explicitly indicated in the repeater configuration or implicitly indicated in the repeater configuration by a second timing offset relative to the starting time.

49. The apparatus of claim 48, wherein the starting time is based at least in part on a capability parameter associated with the repeater.

50. The apparatus of claim 47, wherein the repeater configuration indicates at least one of:
- the repeater is to power on one or more components of the repeater during the time duration,
- the repeater is to power off one or more components of the repeater during the time duration,
- the repeater is to activate an uplink path during the time duration,
- the repeater is to activate a downlink path during the time duration,
- a gain parameter to be used during the time duration,
- a transmit beamforming configuration during the time duration,
- a receive beamforming configuration during the time duration,
- the repeater is to perform one or more measurements during the time duration, or
- the repeater is to transmit one or more reference signals during the time duration.

51. The apparatus of claim 44, wherein the repeater configuration comprises:
- a downlink repeater configuration;
- wherein the apparatus further comprises:
  - means for receiving an indication of an uplink repeater configuration for the repeater; and
- wherein the means for communicating with at least one of the wireless communication device or the UE comprises:
  - means for at least one of receiving one or more downlink communications from the wireless communication device or transmitting one or more downlink communications to the UE based at least in part on the downlink repeater configuration; and
  - means for at least one of receiving one or more uplink communications from the UE or transmitting one or more uplink communications to the wireless communication device based at least in part on the uplink repeater configuration.

52. The apparatus of claim 51, wherein the means for at least one of receiving one or more downlink communications from the wireless communication device or transmitting one or more downlink communications to the UE, are to:
- means for at least one of receiving one or more downlink communications from the wireless communication device or transmitting one or more downlink communications to the UE in a first time duration indicated in the downlink repeater configuration; and
- wherein the means for at least one of receiving one or more uplink communications from the UE or transmitting one or more uplink communications to the wireless communication device, are configured to:
  - means for at least one of receiving one or more uplink communications from the UE or transmitting one or more uplink communications to the wireless communication device in a second time duration indicated in the uplink repeater configuration,
  - wherein the first time duration and the second time duration are non-overlapping time durations.

53. The apparatus of claim 44, wherein the means for receiving the indication of the repeater configuration comprises:
- means for receiving the indication of the repeater configuration in a medium access control (MAC) control element (MAC-CE) communication;
- wherein the repeater configuration comprises a periodic or semi-static repeater configuration; and
- wherein the means for communicating with at least one of the wireless communication device or the UE comprises:
  - means for communicating with at least one of the wireless communication device or the UE in a plurality of time durations based at least in part on the periodic or semi-static repeater configuration.

* * * * *